United States Patent
Piva et al.

(10) Patent No.: US 12,298,158 B2
(45) Date of Patent: May 13, 2025

(54) POSITION/DISPLACEMENT TRANSDUCER APPARATUS, AND RELATED SYSTEM AND METHOD

(71) Applicant: LIKA ELECTRONIC S.R.L., Carrè (IT)

(72) Inventors: Ruggero Piva, Quinto Vicentino (IT); Marco Calabrese, Schio (IT)

(73) Assignee: LIKA ELECTRONIC S.R.L., Carrè (IT)

( * ) Notice: Subject to any disclaimer, the term of this patent is extended or adjusted under 35 U.S.C. 154(b) by 189 days.

(21) Appl. No.: 17/697,226

(22) Filed: Mar. 17, 2022

(65) Prior Publication Data

US 2022/0299343 A1    Sep. 22, 2022

(30) Foreign Application Priority Data

Mar. 19, 2021    (IT) ..................... 102021000006692

(51) Int. Cl.
*G01D 5/244* (2006.01)

(52) U.S. Cl.
CPC ............................... *G01D 5/24438* (2013.01)

(58) Field of Classification Search
CPC .. G01D 5/2451; G01D 5/2454; G01D 5/2457; G01D 5/2458; G01D 5/2497; G01D 5/3473; G01D 5/34746; G01D 5/34776; G01D 2205/26
USPC ......................................... 324/207.2–207.26
See application file for complete search history.

(56) References Cited

U.S. PATENT DOCUMENTS

| | | | | |
|---|---|---|---|---|
| 4,829,248 A | * | 5/1989 | Loubier | G01D 5/142 341/15 |
| 5,907,200 A | * | 5/1999 | Chitayat | G01D 5/145 318/135 |
| 6,243,023 B1 | * | 6/2001 | Katagiri | G01D 3/022 340/870.31 |

(Continued)

FOREIGN PATENT DOCUMENTS

| | | | | |
|---|---|---|---|---|
| EP | 2410298 A2 | * | 1/2012 | ......... G01D 5/34784 |
| EP | 3069889 A1 | * | 9/2016 | ............ B41J 11/007 |

(Continued)

*Primary Examiner* — Akm Zakaria
(74) *Attorney, Agent, or Firm* — CANTOR COLBURN LLP

(57) ABSTRACT

A position/displacement transducer apparatus includes encoders arranged along a measurement path along which a position/displacement encoding periodic array is arranged, having contiguous elements with alternate dual characteristics. There is at least one transition region of discontinuity in periodicity of the periodic array and/or unreadable, the periodic array subject to a mutual motion with respect to encoders along the measurement path, defining the ends of a reading window having a greater length than the estimated maximum size of the transition region so they are not simultaneously involved by the transition region during mutual motion. A controller emits a transduced position/displacement on the basis of signals from encoders and switches from use of one encoder to use of the other to manage the presence of the transition region. The controller switches from default use temporarily to use of the upstream encoder while the downstream encoder is at the transition region.

24 Claims, 8 Drawing Sheets

(56) References Cited

U.S. PATENT DOCUMENTS

| | | | |
|---|---|---|---|
| 8,253,413 B2* | 8/2012 | Hammerschmidt | G01R 33/095 324/207.25 |
| 8,732,967 B2* | 5/2014 | Hiller | G01D 5/2451 33/1 PT |
| 10,273,086 B2* | 4/2019 | Bassi | B65G 15/64 |
| 11,536,591 B2* | 12/2022 | Al-Jaf | G01D 5/2451 |
| 2005/0236558 A1* | 10/2005 | Nabeshima | G01D 5/34746 250/221 |
| 2010/0072988 A1* | 3/2010 | Hammerschmidt | G01D 5/142 324/207.25 |
| 2012/0124848 A1* | 5/2012 | Kirchberger | G01D 5/2497 33/1 PT |
| 2012/0124849 A1* | 5/2012 | Hiller | G01D 5/34707 33/1 PT |
| 2012/0313623 A1* | 12/2012 | Hammerschmidt | G01R 33/095 324/207.2 |
| 2013/0099708 A1* | 4/2013 | Shimizu | G01D 5/2451 324/207.2 |
| 2014/0002065 A1* | 1/2014 | Gustafsson | H03K 5/24 324/207.25 |
| 2018/0099813 A1* | 4/2018 | Bassi | B41J 11/007 |
| 2018/0364595 A1* | 12/2018 | Shirato | G03F 7/70791 |
| 2021/0278252 A1* | 9/2021 | Al-Jaf | G01D 5/2451 |
| 2022/0299343 A1* | 9/2022 | Piva | G01D 5/24485 |

FOREIGN PATENT DOCUMENTS

| | | | | |
|---|---|---|---|---|
| EP | 3271185 A1 | | 1/2018 | |
| EP | 4060291 A1 | * | 9/2022 | G01D 5/24438 |
| EP | 4254794 A1 | * | 10/2023 | G01D 5/3473 |
| JP | 10239105 A | * | 9/1998 | |
| JP | 6291327 B2 | * | 3/2018 | |
| WO | WO-2016146463 A1 | * | 9/2016 | B41J 11/007 |

* cited by examiner

POSITION/DISPLACEMENT TRANSDUCER APPARATUS, AND RELATED SYSTEM AND METHOD

CROSS-REFERENCE TO RELATED APPLICATIONS

This application is related to and claims the benefit of Italian Patent Application No. 102021000006692, filed on Mar. 19, 2021, the contents of which are herein incorporated by reference in their entirety.

TECHNICAL FIELD

The present disclosure relates to a position/displacement transducer apparatus, as well as to related system and method.

In particular, the disclosure relates to the transduction of angular position and angular displacements, but also of position and displacements of a reciprocating motion along a pre-established trajectory or measurement path, which is open or closed, rectilinear or, at least in principle, also of a curvilinear measurement path, provided that it has a large enough radius of curvature.

BACKGROUND

Position/displacement transducer apparatuses are also called position encoders, rotary encoders in the case of a circular trajectory, and are used to detect the motion of pieces, devices, machine parts, etc.; typically the output of such apparatuses is used to control the same or other devices or machine parts. For example, such encoders can be applied to the rotation axis of a machine or rotating device, or directly or indirectly to a conveyor belt, or in general to members moving along pre-established open or closed trajectories, to check for example the regularity of motion thereof, or to control another device based on the position, speed or acceleration of the body being detected, for example in synchronism with the body.

An encoder is an apparatus capable of identifying a periodic change, due to motion, of a physical quantity, and transducing this change into a signal having at least two distinct or dual logical states. The periodic physical quantity may be of any different nature, and may derive from the application of optical, magnetic, electric (resistive, capacitive, inductive) principles, etc. In the encoder, one or more sensors suitable for detecting the physical quantity transduce its periodic change into one or more periodic electric signals, which periodicity is correlated with the periodicity of the physical quantity. Said periodic electric signals, or derived forms thereof, typically are or comprise binary signals having a logical 0 level and a logical 1 level.

Encoders, if they produce binary signals having a logical 0 level and a logical 1 level, are sometimes called incremental encoders; if they produce binary signals having a logical 0 level and a logical 1 level paired with a signal identifying a specific position of the mutual motion are sometimes called pseudo-absolute incremental encoders; if they produce an n-bit signal which univocally encodes the various positions of the mutual motion are sometimes called absolute encoders.

Hereinbelow reference will be mainly made to encoders of an incremental type, including pseudo-absolute incremental encoders, purely by way of non-limiting example. Those skilled in the art will understand how to apply the disclosure to the case of encoders of an absolute type.

If the periodic electric signal produced by the sensor/s is of the sinusoidal type, devices like interpolators may be used to increase the resolution of the transducer apparatus, decreasing the period with which the change of the physical quantity repeats itself to a submultiple thereof.

Encoders of an optical type are based on the detection, through suitable photoelectric sensors, of the absence/presence or of the intensity change of the light (or more in general of a signal of the electromagnetic spectrum) which is reflected/diffused/transmitted by a periodic ordered arrangement or array of contiguous elements having alternate dual characteristics (for example black and white elements, holed/transparent and non-holed/photo-absorbing zones, mirrors and photo-absorbing elements, etc.), in mutual motion with respect to the optical sensor/s.

In the case of encoders of the electric type, the contiguous elements having alternate dual characteristics are for example resistive, capacitive, inductive elements etc., and they are detected by suitable electric circuits.

Incremental encoders of the magnetic type are based on the change of the magnetic flux detected by one or a pair of magnetic sensors, typically of the Hall effect or magneto-resistive type, produced by a periodic array of contiguous elements having alternate magnetic polarities, in mutual motion with respect to the magnetic sensor/s. As a result of the mutual motion, the sensor generates a signal, or a pair of signals in quadrature, variable with the same periodicity, from which a series of pulses and/or wave fronts are typically derived which allow the detection and quantification of the relative displacements; from the overall displacement with respect to a specific position, taken as a reference, the position along the trajectory may also be indicated. In the magnetic quadrature encoders, there are at least two magnetic sensors with a single magnetic element capable of producing a periodic signal, and suitably arranged so as to simultaneously produce two analog signals in phase quadrature (Hall effect sensors); or at least one magnetic sensor with double magnetic element capable of producing the two analog signals in quadrature (magneto-resistive effect sensors). The series of pulses and/or wavefronts, or the two series in quadrature, has/have a frequency correlated with the periodicity of the periodic array of contiguous elements with alternate magnetic polarities; the phase shift between the analog signals and the two series of pulses and/or wavefronts in quadrature indicates the direction of the mutual motion (according to which one leads in phase).

An apparatus using an incremental encoder as a transducer element is provided with a counter which, at the wavefronts and/or pulses, is always increased, or is increased and decreased, respectively, according to the phase shift between the series of pulses and/or wavefronts, and thus to the direction of the movement.

In the present description and in the attached claims, expressions "period" and "frequency" and those derived therefrom are meant as referring to the spatial domain, not to the time domain, unless otherwise indicated. Furthermore, the above expressions are used with reference to the theoretical design or rated magnitudes even when the progression in practice departs from a periodic phenomenon because of errors and/or system tolerances.

The practical application of incremental encoders of the magnetic type described above involves some problems. In the case of a closed trajectory, the periodic array should ideally contain exactly an integer number of pole pairs. This would in fact be possible only by providing the magnetization on site, after assembly, and also in this case it might not be possible to respect a desired resolution (and therefore a spatial period of the periodic arrangement). Of course, magnetization on site is extremely expensive and complex, if not even impossible in certain applications. Such problems are felt, to a given extent, also in the case of open trajectories. Among other things, the realization of the magnetization must be very accurate and, in order to have an adequate resolution of the transducer system, the period of the magnetic pole pairs should be small; vice versa the motion trajectory can be quite long.

To obviate thereto, it is generally preferred to provide for supports or tapes of a suitable material, provided with a periodic array having the desired period, which may be supplied in rolls or in pieces of a preset length. For example, the tapes may be comprised of a magnetic band embedded in a plastic filler, which preferably is in turn welded to a woven fabric with high resistance to extension.

In order to cover the entire length of the trajectory, it may be necessary to use two (or more) tapes, perhaps cut to size from the roll or from the pieces of preset length. At the two respective tape ends arranged adjacent to each other, generally a discontinuity in the periodicity of the array and/or an unreadable zone forms. In the case of a closed trajectory, even using a single tape, such a discontinuity generally forms at the two ends thereof, which also are arranged adjacent to each other. Moreover, even when the periodicity is precisely observed in the passage from one tape to another or from one end to the other of the same tape, discontinuities may occur during use, caused for example by thermal expansions of the body to which the tape is applied.

Analogous problems are encountered in the case of encoders of another type, for example optical or electric ones.

The operation of an incremental encoder is, in an immediately understandable manner, compromised by the presence of such a discontinuity in the periodicity of the periodic array and/or zone without magnetization (or in general, without contiguous elements with dual characteristics) in the transition region between two tape lengths. Indeed, in such a region of the motion trajectory, the sensors are not immersed in the magnetic field (or other physical quantity) and as a consequence they do not emit fronts/pulses (or they emit them without regularity). Therefore, a possible counter associated with the encoder suffers from a count loss between the last complete pole (or in general, element of the periodic arrangement) before the transition region and the first complete pole (or in general, element of the periodic arrangement) after the transition region, a count loss which may have a size even largely greater than a spatial period of the periodic arrangement.

In order to obviate thereto, WO 2016/146463A1 to Habasit AG, corresponding to EP3271185, provides for use of a pair of incremental magnetic encoders arranged along the trajectory of a conveyor belt having an embedded periodic array of magnetic markers which has a joint zone. The encoders are arranged at a mutual distance greater than the length of the joint zone. In order to decide which of the two encoders should be used to provide the output signal, the document provides for a—not magnetic, preferably optical—reference marker which indicates the imminent approach of the joint when detected by an upstream marker detector, and that the passage of the joint has taken place when detected by a downstream marker detector. The output of the upstream encoder is used by default, there is a switch to the downstream encoder when the upstream reference marker detector detects the reference marker, and the default upstream encoder is returned to when the downstream reference marker detector detects the reference marker. So, by default the upstream encoder is used, and the downstream encoder is only used while the upstream encoder is involved by the joint. In order to take the various phase shifts at stake into consideration, the document provides for a somewhat complex system for adjusting the output signal when switching from one encoder to the other one, which provides for, among other things, determining some phase shifts with a two-channel oscilloscope.

SUMMARY

The Applicant observes that the use of the reference marker, said adjustment system of the output signal, and the measurement with oscilloscope, besides involving additional installation and operation costs, bring in further variables and sources of error or imprecision in the position/displacements transduction.

The Applicant faced the technical problem of providing for an alternative solution, and in particular a more efficient one, for managing the presence of the transition region.

In an aspect, the disclosure relates to a position/displacement transducer apparatus capable of producing an incremental or absolute position information independently of the presence of one or more interruptions of a support that acts as a source of a physical quantity variable as a consequence of mutual motion between the apparatus and the support.

The disclosure also relates to a position/displacement transducer apparatus comprising:

a pair of encoders arranged along a measurement path along which a position/displacement encoding periodic array is arranged, having contiguous elements with alternate dual characteristics, wherein along the measurement path there is at least one transition region of discontinuity in periodicity of the periodic array and/or unreadable, the periodic array being subject, in use, to a mutual motion with respect to the encoders along the measurement path, the encoders defining the ends of a reading window having a greater length than the estimated maximum size of the transition region so that they are not simultaneously involved by the transition region during the mutual motion, a controller which emits a transduced position/displacement on the basis of signals from the encoders, and which switches from use of one encoder to use of the other encoder in order to manage the presence of the transition region, wherein the controller switches from default use, when the transition region is out of the reading window of the apparatus, of the downstream encoder, temporarily to use of the upstream encoder while the downstream encoder is at the transition region.

The encoders are preferably incremental encoders, including pseudo-absolute incremental encoders.

In the present description and in the attached claims, expression "transduced position/displacement" is used to indicate "transduced position and/or transduced displacement".

In the present description and in the attached claims, expression "use an encoder" is used to indicate that the transduced position/displacement is derived from the signal of an encoder, wherein "derive" is broadly used to encompass "coincides with".

In the present description and in the attached claims, expressions "upstream" and "downstream" refer to the oriented direction of mutual motion, in the considered instant in the case of a bidirectional motion. Expressions like "enter", "arrive", "leave" a position or a region should also be understood with reference to the oriented direction of mutual motion.

The Applicant has perceived that using by default the output of the downstream encoder, the switch to the secondary, upstream encoder needs to be less immediate when the transition region is arrived at because the downstream encoder is still at the periodic array and the upstream encoder is not in use; thus it is possible to decide the most convenient instant to switch to the upstream encoder; furthermore it is not even necessary to predict in advance nor to instantaneously recognize the arrival of the transition region at the reading window of the apparatus; furthermore, such arrival may be recognized by the apparatus itself, which does not find the same periodicity any more, thus making the use of additional components unnecessary.

The transition region includes at least one of: an unreadable region, an incomplete spatial period at the end of one of the lengths of the periodic array, and an incomplete spatial period at the end of the other of the lengths of the periodic array.

The periodic array is arranged along a preponderant part of the measurement path, and the transition region has typically a length much shorter than the length where the periodic array is regular.

The periodic array preferably comprises regions magnetized in an orthogonal direction to a detection surface of each encoder. The magnetized regions typically are of a same extent along the measurement path, a magnetized region having the north pole facing the encoders and the contiguous magnetized region(s) having the south pole facing the encoders. In general, the contiguous elements with alternate dual characteristics are typically of a same extent along the measurement path.

Typically, the pair of encoders is stationary with respect to the measurement path and the periodic array is integral with a body movable with respect to the measurement path, of which body it is necessary to detect the position and/or measure the displacements and/or the speed and/or the acceleration, but an opposed configuration wherein the periodic array is stationary and the encoders are movable integrally with a body is possible.

Preferably, the temporary use of the upstream encoder begins before the downstream encoder enters the transition region.

Alternatively or additionally, preferably the temporary use of the upstream encoder ends after the downstream encoder leaves the transition region.

In this manner, one or two safety margins about the transition region relative to the downstream encoder are considered, thus providing a further guarantee that its signal is in use, for the position/displacement transduction, only when it is at the periodic array.

Preferably, the controller uses the downstream encoder during the step wherein the transition region is not within the reading window of the apparatus and additionally at least during the detection of a first displacement by the downstream encoder while the transition region is within the reading window of the apparatus, but the downstream encoder is not at the transition region, wherein the first displacement is such that the upstream encoder meets and passes the transition region.

In this manner, one continues to use the downstream encoder until the upstream encoder passed the transition region, this condition being ensured by the waiting for the displacement, which is advantageously measured by the same encoder in use, namely the downstream one. It should be noted that the displacement may advantageously be preset at a suitable value in an independent manner from the actual extent of the transition region, which may be subject to changes for working tolerances, length changes due to the operating conditions and to wear, etc.

Alternatively or additionally, preferably, the controller uses the upstream encoder at least during a second displacement detected with the upstream encoder, wherein the second displacement is such that the downstream encoder meets and passes the transition region.

In this manner, one continues to use the upstream encoder until the downstream encoder passed the transition region, this condition being ensured by the waiting for the displacement, which is advantageously measured by the same encoder in use, namely the upstream one. It should be noted that in this case also the displacement may advantageously be preset at a suitable value in an independent manner from the actual extent of the transition region.

Preferably, the entry of the transition region within the reading window of the apparatus is detected from the fact that the upstream encoder goes into error.

This provision advantageously allows the same upstream encoder to be exploited in order to promptly have an indication of the arrival of the transition region. Thanks to the fact that the error is evaluated on the upstream encoder, which is not in use, advantageously there is no risk of loss of any position/displacement data even if the signal went into error with a small delay with respect to the beginning of the transition region. However, other methods for detecting such entry may be used, including the use of a marker integral with the periodic array and of a detector of such marker.

Irrespectively of whether the fact that the upstream encoder goes into error is used, or not, as an indication of the entry of the transition region within the reading window, preferably the fact that the transition region is no longer within the reading window of the apparatus may be estimated from the detection of a third displacement from the position of entry of the transition region within the reading window of the apparatus. The third displacement preferably comprises said first and second displacements. Through this provision, a special marker and detector of leave from the transition region is advantageously avoided.

Preferably, when switching to use the upstream encoder, the controller takes an absolute reference position, possibly also emitting an absolute zero signal. In this manner, the apparatus also operates as an absolute position encoder, without the need for a special marker and for a detector of such marker.

Preferably, the encoders are of the interpolation type and the controller waits, to switch from use of the downstream encoder to use of the upstream encoder and/or vice versa, for a zero pulse to be detected by a same encoder, more preferably by the downstream encoder. In other terms, the switchings between the encoders occur simultaneously with a zero pulse of the downstream encoder. Furthermore, it follows that the downstream encoder remains in use for a duration which is a multiple of the pitch of the poles of the periodic array.

In the present description and in the attached claims, under "zero pulse" a signal emitted by an encoder once or twice per period of the periodic array is meant to be indicated, in particular at each transition between contiguous elements or at each transition from an element having one of the dual characteristics to an element having the other one of the dual characteristics. Such a signal is emitted, for example, at each zero crossing by the rising edge of a raw sinusoidal voltage signal of one of the sensors of a magnetic encoder. The Applicant has recognized that the zero pulses, although corresponding to a coarser resolution with respect to the wavefronts of an interpolated square wave, correspond more precisely with the periodicity of the periodic array, while the interpolated wavefronts of a square wave are subject at least to the interpolation error, so that the response of the sensor of the encoder in terms of number of wavefronts of a square wave versus displacement within one spatial period is hardly linear in practice. The Applicant has perceived that the overall performance of the apparatus is better using the zero pulses, alone or additionally to the wavefronts of a square wave, despite the fact that said displacements may turn out to be longer than what would be needed making reference only to the wavefronts of a square wave.

Alternatively or additionally to be of the interpolation type, the encoders are preferably of the quadrature type, making transduction easy even in the case of bidirectional mutual motion.

Preferably, the controller is configured to:
obtain or measure, preliminarily, a total length of the measurement path,
and, at each travel of the measurement path:
while the upstream encoder is in use, keep the transduced position/displacement in accordance with the output of the upstream encoder,
while subsequently the downstream encoder is in use, adapt the transduced position/displacement so that it varies, apart from an additive factor, between two extreme values given by: (i) the length that was measured while the upstream encoder was in use, and (ii) the total length of the measurement path.

The additive factor is null in case an absolute reference position is used.

The feature here described is a particularly innovative aspect of the subject-matter disclosed herein, independently of the other aspects described above and in particular independently of the fact of using by default the downstream encoder and temporarily switch to the upstream encoder.

It is emphasized that the length measured by the encoders is an amount expressed in a unit of measurement not necessarily corresponding to a linear length unit of measurement, typically in a count of zero pulses and/or in a count of wavefronts of a square wave that are not necessarily evenly spaced in space. In case there are plural transition zones, the expression "travel of the measurement path" should be understood as "travel of the path comprising a transition region and a contiguous length of periodic array".

In this manner it is possible to provide, as requested by some applications, for a transduced position/displacement having a constant maximum value at the end of the measurement path, independently of changes at each travel of the measurement path, in particular at each turn in the case of a rotary encoder. These changes are advantageously distributed over the preponderant part of the measurement path wherein the downstream encoder is active, thus becoming neglectable. It is noted that, especially when the controller waits, to switch from use of an encoder to the other one, for the detection of a zero pulse by the downstream encoder, the total measurement performed by the downstream encoder is constant.

More specifically, the controller is configured to, in a setting condition:
obtain as input or measure a total length of the measurement path,
obtain a length measured by the downstream encoder in a preliminary travel of the measurement path,
and, at each subsequent travel of the measurement path:
while the upstream encoder is in use, keep the transduced position/displacement in accordance with the output of the upstream encoder,
compute an expected length which should be measured by the downstream encoder as difference between the total length of the measurement path and the length measured by the upstream encoder while it has been consecutively in use, and
keep the downstream encoder in use until it has measured a displacement equal to the length that it had measured during the preliminary travel of the measurement path, providing a transduced position/displacement correlated with the output of the downstream encoder and with the ratio between the expected length and the length measured by the downstream encoder during the preliminary travel of the measurement path The downstream encoder remains in use for a duration which turns out to be a multiple of the period of the periodic array when the switching between the encoders occurs at the zero pulse.

Alternatively or additionally to the above discussed adaptation of the transduced position/displacement, the controller is preferably configured to:
obtain or measure, preliminarily, a total length of the measurement path,
receive in input a desired maximum value for the transduction of the total length of the measurement path, and
adapt the transduced position/displacement so that at each subsequent travel of the measurement path it varies, apart from an additive factor, from zero to the desired maximum value.

The additive factor is null in case an absolute reference position is used.

In this way, the configuration of the apparatus may be customized based on the requirements of the user for which the position/displacement transduction is intended.

In either case, the operation of obtaining as input or measuring a total length of the measurement path comprises computing the total length as the sum of the length measured by the upstream encoder while it is in use, and the length measured by the downstream encoder while it is in use during the or respectively a preliminary travel of the measurement path. In this manner, the apparatus is capable of self-installing, and it is also possible to repeat the setting step as often as desired, for example after a certain time of use of the body under measurement in order to take the effect of wear, vibrations, etc. into account.

Preferably the apparatus comprises at least one and preferably all the following outputs:
at least one square wave signal and preferably two signals in quadrature, corresponding to or derived from that/those of the encoder in use,
a zero pulse signal of the periodic array, corresponding to or derived from that/those of the encoder in use,
an error signal,
an absolute zero pulse signal, wherein a pulse is emitted at the position taken as an absolute reference along the measurement path,
at least one digital count signal codifying a position, preferably an absolute position with respect to the absolute reference position, and/or a relative displacement.

In this manner, the transducer apparatus provides for outputs corresponding to the standard outputs of an encoder and may thus be advantageously used with apparatuses provided with standard inputs for encoder(s). The apparatus itself embodies an encoder, in particular an incremental encoder, and may be called compound encoder.

Preferably, the controller is configured to carry out the steps of:
a) using the downstream encoder to derive the transduced position/displacement,
b) detecting the entry of the transition region into the reading window of the apparatus, preferably through detecting the fact that the upstream encoder goes into error,
c) waiting for the upstream encoder to pass past the transition region, carried out by measuring with the downstream encoder a first displacement,
d) using the upstream encoder to derive the transduced position/displacement,
e) waiting for the downstream encoder to pass past the transition region, carried out by measuring with the upstream encoder a second displacement,
f) returning to step a) of using the downstream encoder to derive the transduced position/displacement.

Each of the above mentioned displacements is preferably equal to a preset integer number of zero pulses and/or a preset integer number of wavefronts of a square wave and/or a preset integer number of wavefronts of a square wave emitted in sequence after a preset integer number of zero pulses, the pulses being emitted by the involved encoder.

More preferably, one or more of the above mentioned displacements comprise(s) an integer number of zero pulses emitted by the involved encoder. The Applicant has recognized that the zero pulses, although corresponding to a worse resolution than the wavefronts of a square wave, correspond more precisely to the periodicity of the periodic array, while the wavefronts of a square wave are subject at least to the interpolation error, so that the response of the magnetic sensor in terms of number of wavefronts of a square wave versus displacement within a spatial period is hardly linear in practice. The Applicant has perceived that the overall apparatus performance is better using the zero pulses, alone or additionally to the wavefronts of a square wave, despite the fact that the above mentioned displacements may turn out to be longer than what would be necessary by only referring to the wavefronts of a square wave.

Preferably the controller is configured to carry out, between said step c) and said step d), the step of waiting for a subsequent zero pulse of the downstream encoder. In this manner, the overall waiting before switching to the upstream encoder is by a variable overall displacement, but advantageously a more stable reference is used.

Alternatively or additionally, preferably the controller is configured to carry out, between said step e) and said step f), the step of waiting for a subsequent zero pulse of the downstream encoder. In this manner, the duration of use of the upstream encoder is by a variable overall displacement, but advantageously a more stable reference is used.

Preferably the measurement path is a closed path, for example a circular one as in the case of a rotating body, or a looped one as in the case of a conveyor belt. In this case, they are rotary encoders.

When the transition region is a single one, the two lengths of periodic array separated by the transition region are at the opposed ends of a same periodic array.

Preferably, the pair of encoders comprises encoders of a magnetic type.

In another aspect, the disclosure relates to a position/displacement transducer system comprising the above mentioned apparatus and periodic array.

In an embodiment of the system, the periodic array is made in a band embedded in a conveyor belt.

In an aspect, the disclosure relates to a method for transducing a position and/or displacements, comprising the steps of:
arranging a pair of encoders along a measurement path along which a periodic array is arranged, having contiguous elements with alternate dual characteristics, wherein along the measurement path there is at least one transition region of discontinuity in periodicity of the periodic array and/or unreadable,
subjecting, in use, the periodic array to a mutual motion with respect to the encoders along the measurement path, the encoders defining the ends of a reading window having a greater length than the estimated maximum size of the transition region so that they are not simultaneously involved by the transition region during the mutual motion,
emitting a transduced position/displacement on the basis of signals from the encoders, switching from use of one encoder to use of the other encoder in order to manage the presence of the transition region,
characterized by comprising the steps of:
using by default, when the transition region is out of the reading window of the apparatus, the downstream encoder,
temporarily using the upstream encoder while the downstream encoder is at the transition region.

Preferred features of the method correspond to preferred features of the above described controller.

BRIEF DESCRIPTION OF THE DRAWINGS

Further features and advantages of the present disclosure will become clearer from the following detailed description of some preferred embodiments thereof, made with reference to the attached drawings, wherein.

DETAILED DESCRIPTION OF THE DRAWINGS

Figure 1:
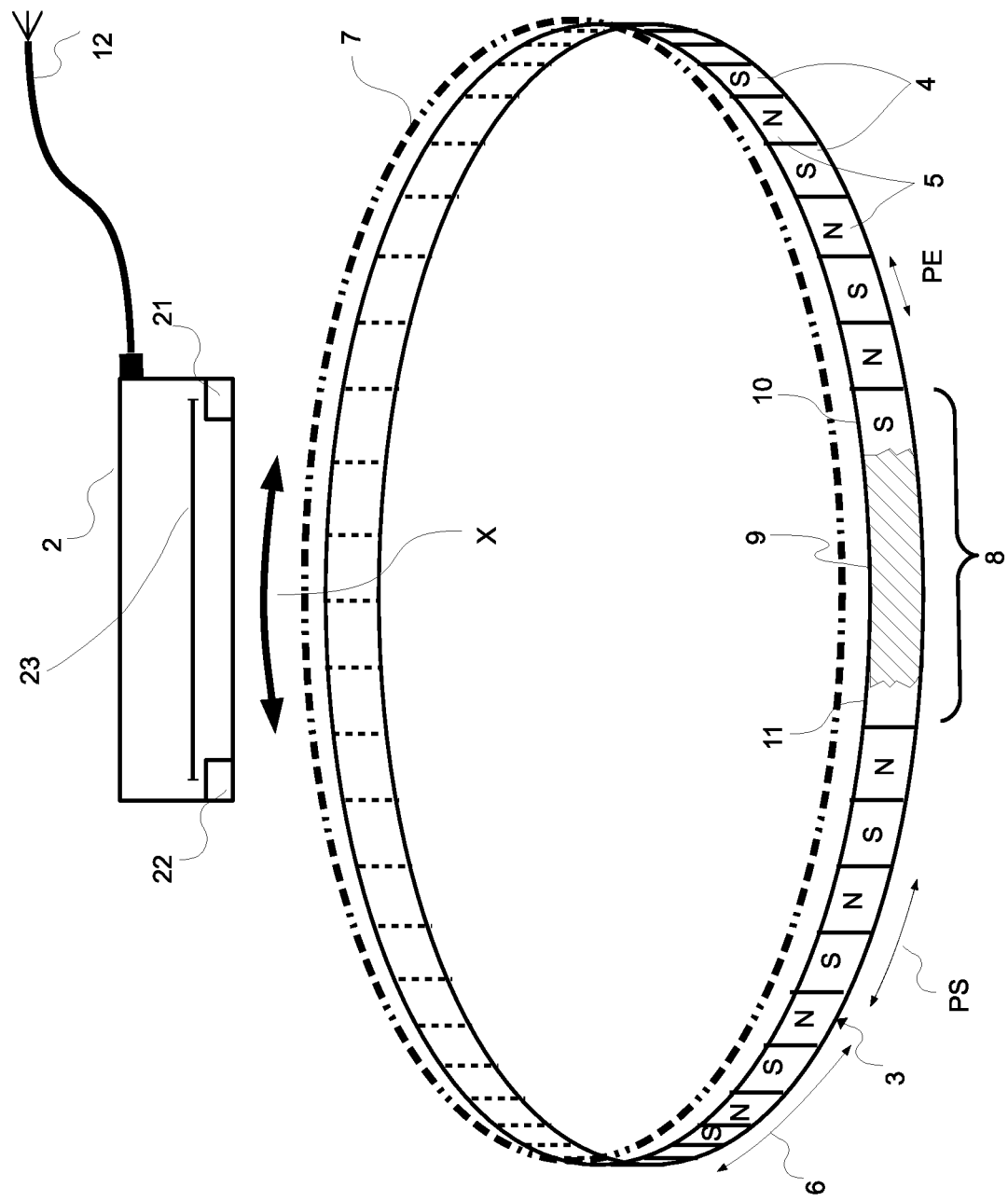
FIG. 1 schematically shows a system for transducing positions and/or displacements.

With reference to FIG. 1, a system 1 for transduction of positions and/or displacements exemplifying the disclosure comprises an apparatus 2 for transducing positions and/or displacements, and a one-dimensional periodic ordered arrangement or periodic array 3 of contiguous elements 4, 5 with alternate dual characteristics, which follow each other along the direction 6 of the array.

Hereinbelow it will be assumed, merely by way of non-limiting example, that the system 1 is of a magnetic type: the apparatus 2 is responsive to the magnetic field and the contiguous elements 4, 5 of the periodic array 3 are elements having alternate magnetic polarities, also briefly called poles 4, 5 hereinbelow. Other possible embodiments, for example of the optical or electric type, are described in the introductory part which is referred to.

In the example magnetic case, the periodic array 3 may comprise for example regions magnetized in a direction orthogonal to a detection surface of each sensor present in the apparatus 2, a magnetized region having the north pole 4 facing the sensor and the contiguous magnetized region(s) having the south pole 5 facing the sensor. Alternatively, a series of magnets with axis parallel to the direction 6 of the periodic array 3 may be provided for.

The periodic array 3 has a (rated) spatial period PS corresponding to the extent of a pair of contiguous elements or poles 4, 5 along the direction 6 of the array. The elements or poles 4, 5 have typically, although not necessarily, the same extent or elementary period PE along the direction 6 of the array.

The apparatus 2 and the periodic array 3 are subject to a mutual motion along a pre-established measurement path 7, or trajectory. The motion direction X is represented in FIG. 1 as a bidirectional arrow. The direction 6 of the array coincides with the motion direction X, so that the mutual motion entails a change of the magnetic field detected by the apparatus 2, having the same spatial periodicity as the array 3 or a periodicity correlated therewith. For example, in case of use of sensor(s) of a magneto-resistive type, the period of the analog transduction signal corresponds to the elementary period PE. In case instead of Hall sensors, the period of the analog transduction signal corresponds to the spatial period PS.

Stated in simple terms, which will become increasingly clearer hereinbelow, the succession of the poles 4, 5 in the detection zone of the apparatus 2 is indicative of the relative displacement between apparatus 2 and array 3. For example, from the detected magnetic field—from said analog transduction signal—a series of pulses and/or of wavefronts are derived, having a frequency correlated with that of the array 3, allowing the relative displacements to be detected and quantified. From the overall displacement with respect to a specific position, taken as a reference, the position along the trajectory 7 may also be indicated.

Typically, one of the apparatus 2 and the array 3 is made integral with a body of which one desires to detect the position and/or the displacements, and the other one of the apparatus 2 and the array 3 is stationary or integral with a second body serving as a reference. For example, the apparatus 2 is mounted stationary with respect to a basement of a machine, and the array 3 is mounted about a drive shaft in order to detect the angular position and/or the angular displacements about the drive shaft, from which to infer speed and acceleration, or the array 3 is mounted along a conveyor belt. However, an opposed configuration is also possible, with moving apparatus 2 and stationary array 3, or even a configuration with both the apparatus 2 and the array 3 moving.

Furthermore, while the measurement path 7 shown in FIG. 1 is a closed path, along which the motion may be one-directional or bidirectional, the mutual motion might also be a reciprocating motion along an open path, rectilinear or having a large enough radius of curvature in each point thereof. An application of the system 1 to an open trajectory is represented for example by the detection of position/displacements of a member moving on a rail, for example in the case of a printing or other processing machine movable with respect to a working surface.

In the theoretical case, the measurement path 7 has a total length L_TOT equal to an integer number of spatial periods PS and the periodic array 3 extends along the entire measurement path 7, without any interruption, allowing the transduction of position/displacements along the entire measurement path 7, even with a single encoder. However, in practice this is not always possible and in general the periodic array 3 extends properly along a preponderant part of the measurement path 7, but along the measurement path 7 there is at least one transition region 8, which is a region of discontinuity in periodicity of the periodic array 3 and/or unreadable. As discussed in the introductory part, this may be due for example to the fact of using one or more pieces of a tape of suitable material already embodying the magnetization required by the periodic array 3, provided with standard lengths or cut to size from a roll, wherein adjacent ends of a same tape or of two tapes are arranged fitting together, or separated by an empty space or gap, or overlapping each other.

In FIG. 1 there is shown a single transition region 8 which separates two ends of a same piece of the periodic array 3 in the case of a closed measurement path 7, and reference will be made hereinbelow to this example case for the sake of simplicity. However, those skilled in the art will understand, in the light of the present description, how to apply the disclosure to the case of plural transition regions 8 and/or to the case of an open measurement path 7.

In general, in a transition region 8 there are one or more among:
 an unreadable region 9, without any magnetization (in general, without elements with alternate dual characteristics) or in any case not suitable for being read (for example, without tape),
 an incomplete period 10 at the end of one of the lengths of the periodic array 3,
 an incomplete period 11 at the end of the other one of the lengths of the periodic array 3.

Each incomplete spatial period 10, 11 may generally comprise:
 a) a single incomplete pole (element),
 b) a single complete pole (element), or
 c) a complete pole (element) and an incomplete opposed pole (element with opposed dual characteristic).

Should the period of the analog transduction signal correspond to the elementary period PE (sensor(s) of the magneto-resistive type), if the incomplete period 10, 11 contains a complete or integer pole (besides possibly an incomplete opposed pole), as in cases b) and c) identified above, this pole will in general be transduced correctly, and it may therefore be considered external to the transition region 8: in other words, the incomplete periods 10, 11 of the transition region 8 comprise a single incomplete pole (case a) identified above).

Those skilled in the art will understand that the following description is generally valid in all cases, and will be able, in the light of the description, to make any change necessary for the specific case.

In each of the above mentioned cases, in the transition region 8 there is therefore a discontinuity in the periodicity of the periodic array 3 and/or an unreadable zone. The transition region 8 has a length, along the measurement path 7 and thus in the direction 6 of the array or motion direction X, much less than the length where the periodic array 3 is regular, but in any case not neglectable.

The position/displacement transducer apparatus 2 of the disclosure is capable of obviating to the presence of the transition region 8 and of providing a transduction of position/displacements along the entire measurement path 7 despite the presence of the transition region 8. In FIG. 1, an output representative of the transduced position/displacement 12 is schematically indicated.

Figure 2:
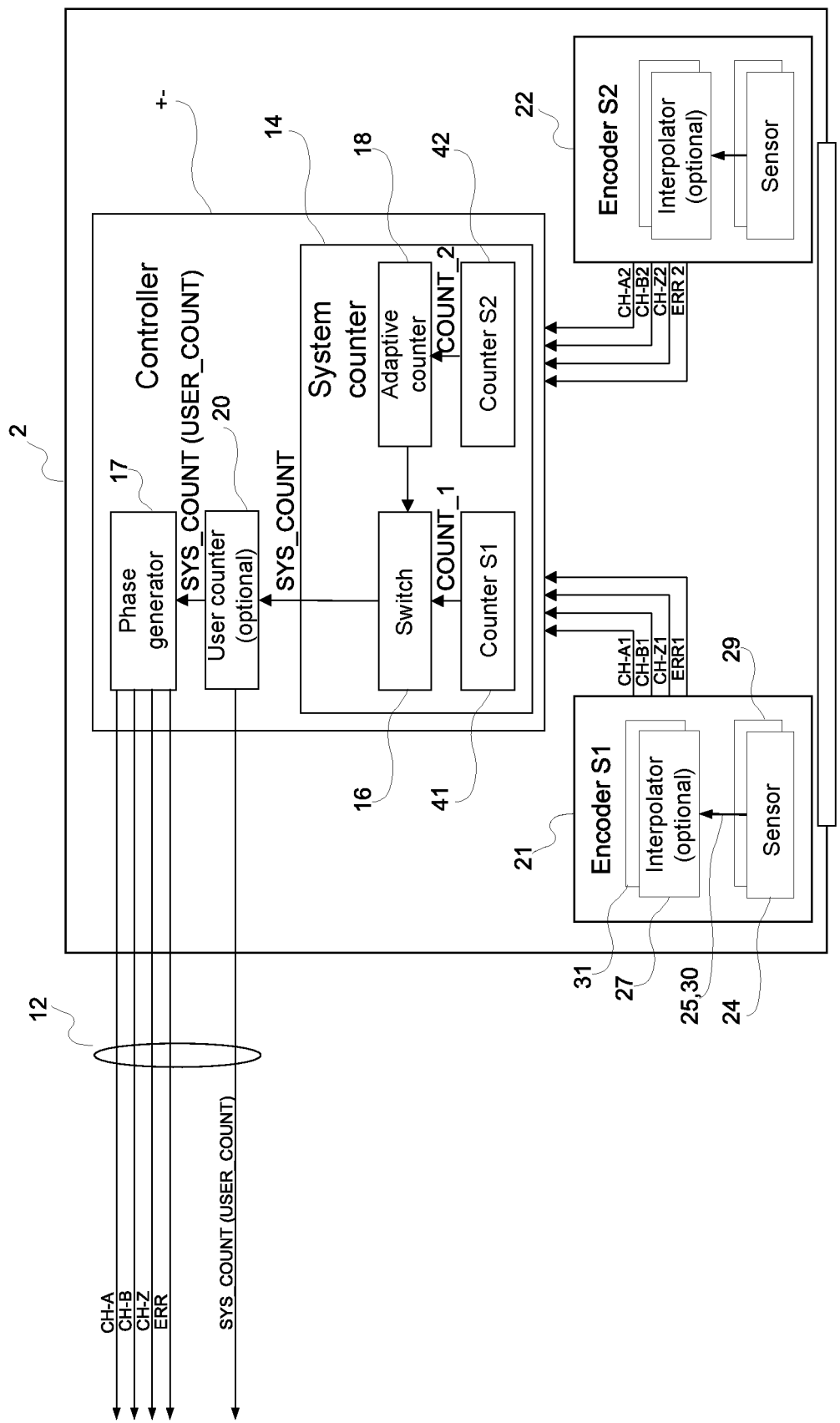
FIG. 2 is a block diagram of an embodiment of an apparatus for transducing positions and/or displacements, FIG. 3 schematically shows the signals emitted by an encoder, in particular by an interpolating incremental quadrature encoder, when it is in different positions along a periodic magnetic array, FIG. 4 schematically shows some mutual positions among some components of the system of FIG. 1 during a mutual motion.

The apparatus 2 comprises, as also visible in FIG. 2, which represents an embodiment thereof through a block diagram, a pair of encoders 21, 22, for example of a magnetic type, defining the ends of a reading window 23 having a greater length than the estimated maximum size of the transition region 8, so that they are not simultaneously involved by the transition region 8 during the mutual motion between apparatus 2 and array 3, and a controller 40 which emits a transduced position/displacement on the basis of signals from the encoders 21, 22.

Each encoder 21, 22 is useful per se for providing a transduction of position/displacements along parts of the measurement path 7 travelled by the periodic array 3. The controller 40 switches from use of the signal of one encoder 21, 22 to use of the signal of the other encoder 22, 21 in order to manage the presence of the transition region 8.

Figure 3:
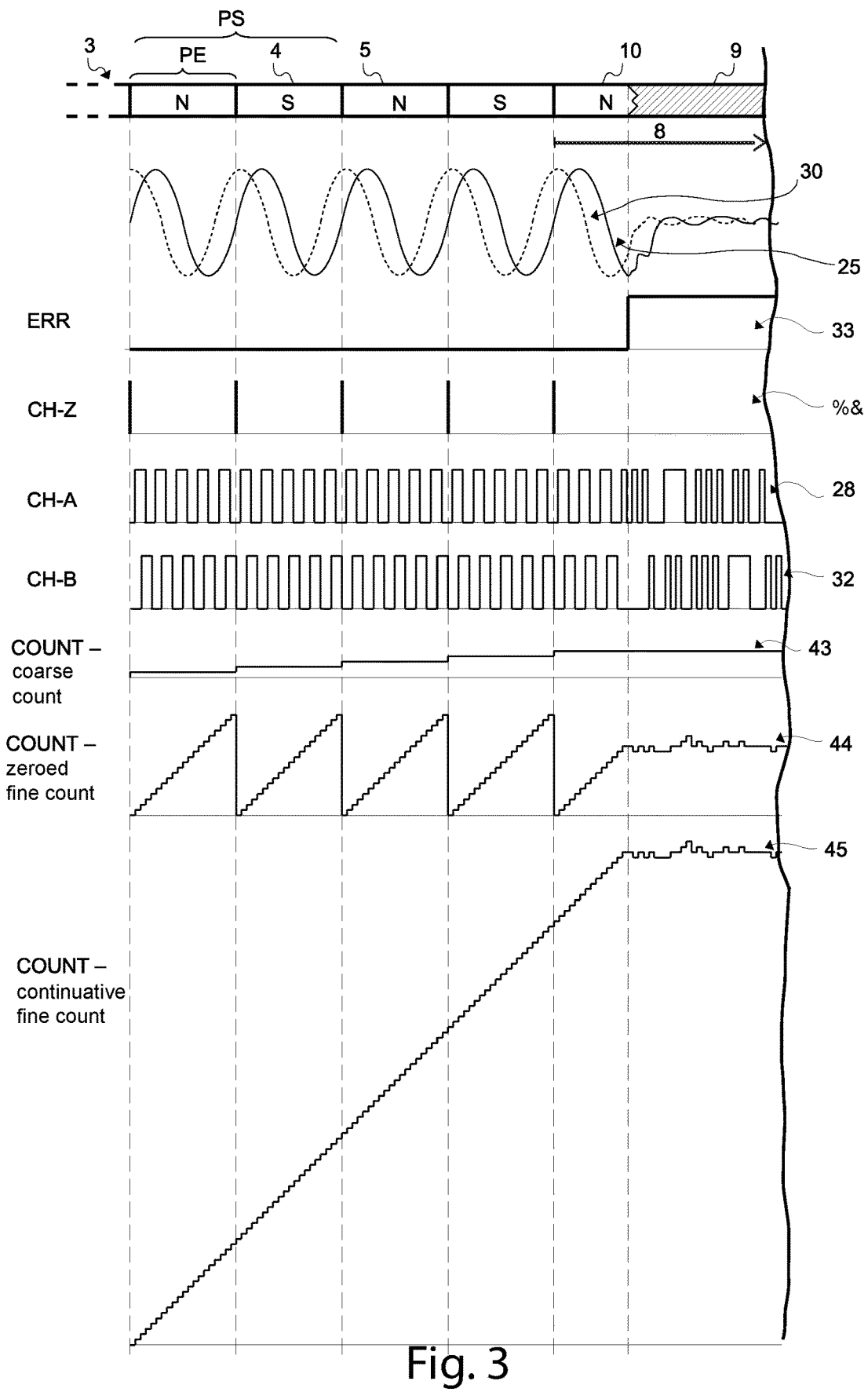

Before describing how the pair of encoders 21, 22 is managed by the controller 40, a possible embodiment of the encoder 21 is described, with reference also to FIG. 3, in the example case of a magneto-resistive sensor, encoder 22 being equal to encoder 21.

Encoder 21 (22) is preferably of the incremental type and has, in a manner known per se, a magnetic sensor 24 which, as its position along the periodic array 3 changes, emits, in the example case of a magneto-resistive sensor, a pair of raw sinusoidal voltage signals 25, 30 which period is equal to the elementary period PE. Should the sensor 24 be a magnetic Hall sensor, it would emit a single raw sinusoidal voltage signal having a period equal to the spatial period PS, but there could be a second magnetic sensor 29 for emitting a second raw sinusoidal voltage signal, again with a period equal to the spatial period PS. In the case of still other sensors, the raw signal could not be a sinusoidal one, but it would in any case have a periodicity equal to or correlated with that of the periodic array 3.

Especially when the mutual motion between apparatus 2 and array 3 is bidirectional, or even just to take vibrations into account, advantageously encoder 21 (22) is a quadrature encoder, wherein the raw signals 25, 30 emitted by the single sensor 24 or by the pair of sensors 24, 29 are in phase quadrature, namely phase shifted by 90°, as shown in FIG. 3.

Incremental encoder 21 (22) preferably emits a zero signal 26 comprising a pulse at each zero crossing of the rising edge of the raw sinusoidal signal 25, and therefore a zero signal having a period equal to the elementary period PE of the periodic array 3. In the case of a Hall sensor, the zero signal has a period equal to the spatial period PS, or, if a zero pulse is emitted at each zero crossing (both of the rising edge and of the falling edge), equal to the elementary period PE.

Zero signal 26 is for example emitted on a channel generally called channel Z or CH-Z; in FIG. 2, the corresponding channels of the two encoders 21 and 22 are indicated as CH-Z1 and CH-Z2.

In case it is, advantageously, of the interpolation type, encoder 21 (22) optionally comprises an interpolator 27 or a pair of interpolators 27, 31, which convert(s) the raw sinusoidal signal(s) 25, 30 into one or a pair of square waves 28, 32. Due to the interpolation factor, the interpolated square wave(s) 28, 32 has/have a frequency which is a multiple of the frequency of the respective raw sinusoidal signals 25, 30, and therefore a number NQ of wavefronts per each pole or element 4, 5 of the array 3. Merely by way of example, in FIG. 3 the square wave 28 has a frequency equal to NQ=5 times that of the raw sinusoidal signal 25; in a practical application of the disclosure, NQ is preferably equal to a power of 2, for example NQ=2048.

The interpolated square wave(s) 28, 32 is/are for example emitted on one or a pair of channels generally called channel A and channel B or CH-A and CH-B; in FIG. 2, the corresponding channels of the two encoders 21 and 22 are indicated as CH-A1, CH-B1 and CH-A2, CH-B2). Also the interpolated square waves 28, 32, when both present, are in phase quadrature.

As is well known, in practice the interpolator circuits do not have a perfectly linear response, both due to inherent limits and due to measurement errors of the sensors, and due to errors in the magnetization (or other property exploited to obtain the dual characteristics) of the support of the periodic array 3, so that the signal on CH-A (CH-B) approximates the square wave 28 (32), but is actually irregular or aperiodic: the NQ wavefronts are generally not equally spaced along each pole or element 4, 5.

Last, each incremental encoder 21, 22 preferably emits, on a channel generally called channel ERR (in FIG. 2, the corresponding channels of the two encoders 21 and 22 are indicated as ERR1 and ERR2), an error signal 33 having a first logical value when the magnetic sensor(s) is/are correctly detecting a magnetic field and a second logical value when the magnetic sensor(s) is/are not able to correctly detect a magnetic field (and analogous conditions in the case of an encoder of another type). As far as of interest herein, the signal on channel ERR will be at the second logical value (a logical "1" in the example case of FIG. 3) while incremental encoder 21, 22 is at the unreadable region 9 of the transition region 8.

In the case of an interpolating quadrature encoder, the evaluation of which one of the square waves 28 and 32 leads in phase with respect to the other one allows the way or oriented direction of the displacement to be determined. Hereinbelow, for the sake of convenience, a motion oriented direction Y (cf. the subsequent FIG. 4) will be assumed such that the signal in use is that detected by the first (or single) magnetic sensor 24, emitted on CH-A.

The extent of a relative displacement between array 3 and encoder 21 (22) from a first position to a second position (where there is the periodic array 3, thus out of the transition region 8) may be obtained, in a manner known per se, from a counter associated with the encoder 21 (22), advantageously embodied within controller 40. In FIG. 3 the counters 41, 42 associated with encoder 21 and with encoder 22, respectively, are shown; hereinbelow only counter 41 is described, counter 42 being identical thereto.

Counter 41 may operate in several modes, and may be zeroed on command.

In a first mode, counter 41 may count the number of pulses of the zero signal 26 emitted on its own channel CH-Z (specifically, on channel CH-Z1) during said displacement from the first to the second position. The resolution that may be obtained using channel Z, indicated as coarse resolution hereinbelow, is thus equal to the elementary period PE or to the spatial period PS, as the case may be as illustrated above. The count of the counter in this case, sometimes called coarse count hereinbelow, is schematized by signal 43 of FIG. 3. The coarse count may be zeroed on command, for example at a position along the trajectory 7 taken as an absolute reference.

In other modes, when the encoder 21 associated therewith is an interpolating and quadrature one, the counter 41 may, alternatively or additionally, count the wavefronts of a square wave 28, 32 of the signals on CH-A and CH-B (specifically, on channels CH-A1 and CH-B1), typically analyzing the phase and the fronts of its two square waves 28, 32 in quadrature or their logical values in appropriately timed instants. The resolution that may be obtained, indicated as fine resolution hereinbelow, in this case is thus equal to the fraction of elementary period PE or of spatial period PS (PE/NQ or PS/NQ) and the counter counts the fractions of poles or elements 4, 5 comprised between the first and second position.

Preferably the counter 41 associated with each encoder 21, 22 of the interpolation type, at fine resolution, may be used in several modes.

In a fine resolution mode, or reset mode, the counter 41 is zeroed at each zero pulse emitted on CH-Z (CH-Z1), while it incrementally counts the wavefronts of the square wave signals 28, 32 during the passage of a single pole; the counter thus takes up a value variable between 0 and NQ−1 along each single pole or element 4, 5. The count of counter 41 in this case, sometimes called zeroed fine count hereinbelow, is schematized by signal 44 of FIG. 3.

In another fine resolution mode, the counter 41 is not zeroed at the zero pulses emitted on CH-Z (CH-Z1) and it incrementally counts the wavefronts of the square wave signals 28, 32 at the passage of subsequent poles or elements 4, 5; the counter therefore also assumes values greater than NQ−1. The count of counter 41 in this case, sometimes called consecutive fine count hereinbelow, is schematized by signal 45 of FIG. 3.

Also the zeroed fine count and/or the consecutive fine count may be zeroed at the position along the trajectory 7 taken as an absolute reference.

The above mentioned modes may be alternative or even coexistent, in case more than one memory location of counter 41 is provided for. Preferably, in the case of the present disclosure, counter 41 (as well as counter 42) is capable of simultaneously keeping a coarse count and a fine count, the fine count being zeroed or continuative according to other conditions that will become clear hereinbelow, so as to have distinct counts of complete poles and of pole fractions at disposal.

The extent of a relative displacement between a first and a second position may be obtained from the difference between the count at the second position and the count at the first position, based again on the above mentioned coarse or fine resolution.

When a specific position along the measurement path 7 is taken as an absolute reference and is made to correspond, for the sake of convenience, to a null count of counter 41 (42), the extent of the displacement counted starting from said specific position also represents the absolute position along the measurement path 7, based again on the above mentioned coarse or fine resolution.

Merely by way of example, an absolute reference may be important in case one has to know the position of a member along a working table, while it may be superfluous in case only the measurement of a relative speed between two bodies is of interest.

In the case of a bidirectional motion, the count of the counter, at the coarse and/or fine resolution, associated with each encoder 21, 22, is incremented in the case of mutual motion in a first oriented direction or positive direction along the measurement path 7 and is decremented in the case of mutual motion in a second oriented direction opposed the first one, or negative direction, along the measurement path 7. As already emphasized, the motion direction is automatically detected in the case of a quadrature encoder 21, 22.

Turning back to FIG. 2, the position/displacement transducer apparatus 2 of the disclosure preferably and advantageously provides (in the manner described hereinbelow) for outputs corresponding to the standard outputs of an encoder, preferably of the incremental type, and in particular of an incremental quadrature encoder, and may therefore be advantageously used with apparatuses provided with standard inputs for such encoders. The transduced position/displacement 12 emitted by the apparatus 2 therefore preferably comprises one or more of (and preferably all) a channel Z or CH-Z, a channel A or CH-A, a channel B or CH-B and a channel ERR, which signals correspond to those shown in FIG. 3 described above.

In the apparatus 2 of the disclosure, the controller 40 implements a system counter 14, which count is indicated herein as system count SYS_COUNT.

Figure 8:
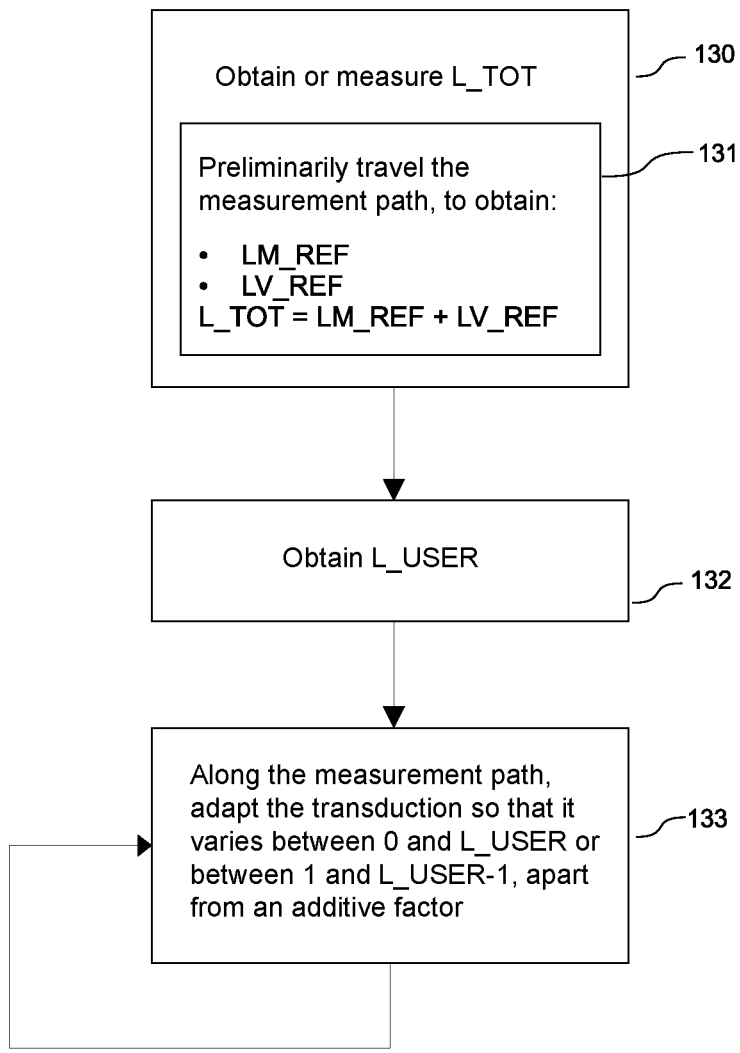

The transduced position/displacement 12 emitted by the apparatus 2 may therefore comprise, alternatively or additionally to the above mentioned channels CH-Z, CH-A, CH-B and ERR, system count SYS_COUNT and/or a derived form thereof, called herein user count USER_COUNT, embodied by a user counter 20 optionally present, and better described hereinbelow with reference to FIG. 8.

System counter 14 of controller 40 implements a switch 16 configured to switch from use of an encoder to use of the other encoder of the pair of encoders 21, 22 in order to derive the system count SYS_COUNT from either one. The counts of counters 41, 42 are emitted as COUNT_1, COUNT_2.

Preferably, the controller 40 derives the signals to be emitted on channels CH-Z, CH-A, CH-B, ERR from system count SYS_COUNT through a module thereof indicated as phase generator 17, in any manner known per se.

System count SYS_COUNT may be at coarse resolution and/or at fine resolution, analogously to what has been described above.

System count SYS_COUNT may be zeroed at startup of apparatus 2 when the system 1 may operate as a relative encoder, or it may be zeroed at a reference position along the measurement path 7, so that the system 1 may operate as an absolute encoder. The operating mode may be programmable or selectable from time to time. An absolute reference position may be advantageously identified as described later on.

Preferably, system count SYS_COUNT is a count at the fine resolution of an absolute position with respect to a reference position and to this case, which is the most complete, reference will be mainly made hereinbelow.

In the block diagram of FIG. 2, a functional block of system counter 14 is further shown, called herein adaptive counter 18, which will be described later on.

With reference also to FIGS. 4-8, how the pair of encoders 21, 22 is managed by the controller 40, in an embodiment of the disclosure, in order to take the presence of the transition region 8 into account is now described.

Figure 4:
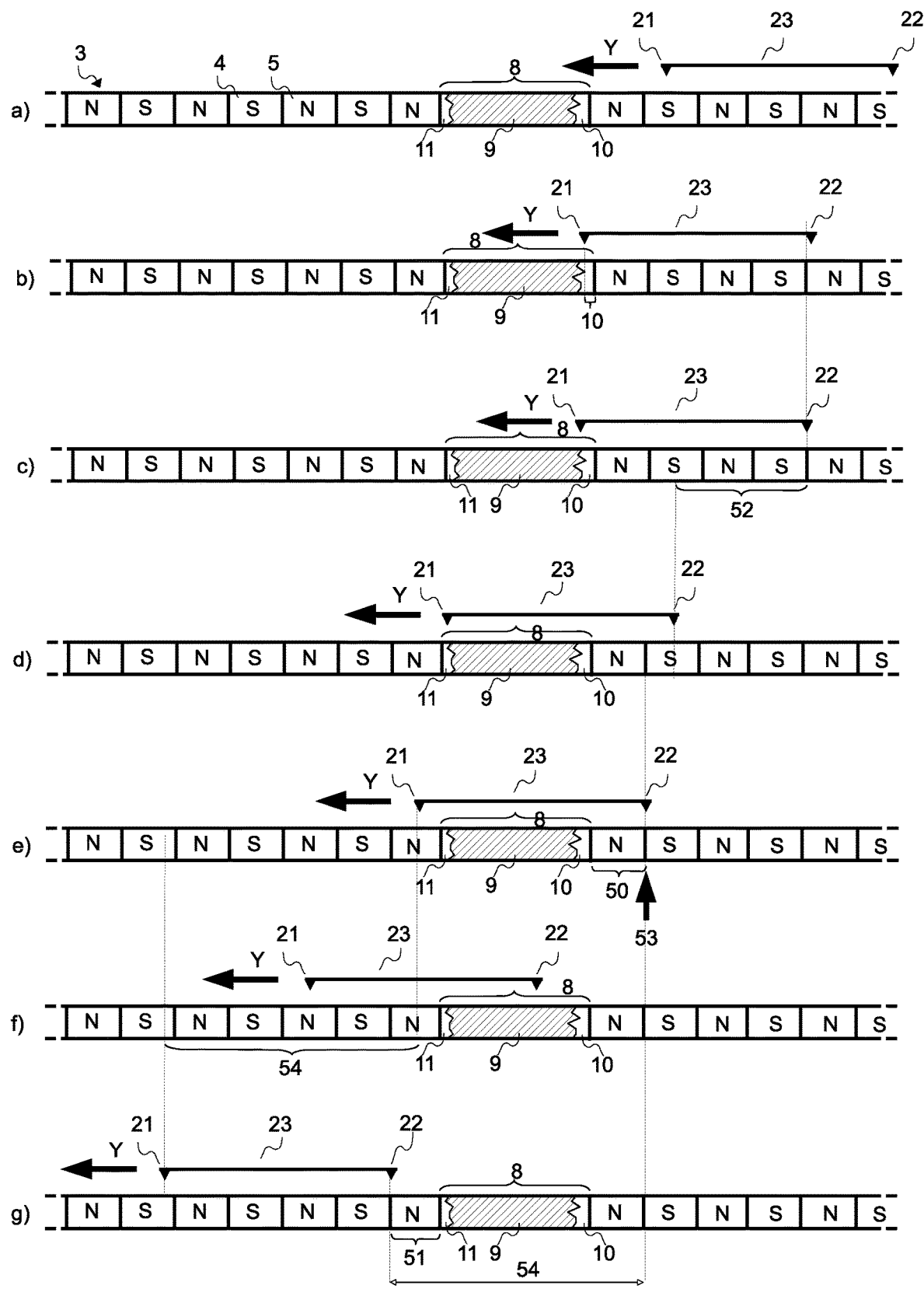

In FIG. 4 some mutual positions between periodic array 3 and reading window 23 of the apparatus 2 are schematically illustrated, during the mutual motion along a measurement path 7 which, by way of example, is assumed to be closed, wherein there is a single transition region 8. For the sake of clarity, some reference numerals are only indicated in the first position (state a)) and are not repeated in the other positions (states b) to g)).

It is assumed that the mutual motion direction is such that the apparatus 2 (and thus its reading window 23 shown in FIG. 4) has a mutual motion with respect to the periodic array 3 from right to left in the drawing sheet, as illustrated by oriented direction Y, the drawing being of course also representative of a motion of the periodic array 3 from left to right in the drawing sheet. The mutual positions are therefore sequential when moving from top to bottom in FIG. 4, namely from state a) to state g) and going then back to state a) during a subsequent trip (or turn) along the closed measurement path 7.

In the case shown, encoder 21 (also indicated as S1) is the upstream encoder and encoder 22 (also indicated as S2) is the downstream encoder.

In FIGS. 5-8 some flowcharts relative to the operation of the apparatus 2 are shown, in particular carried out by controller 40, respectively descriptive of a method for transducing a position/displacements of the disclosure, in an embodiment thereof.

Figure 5:
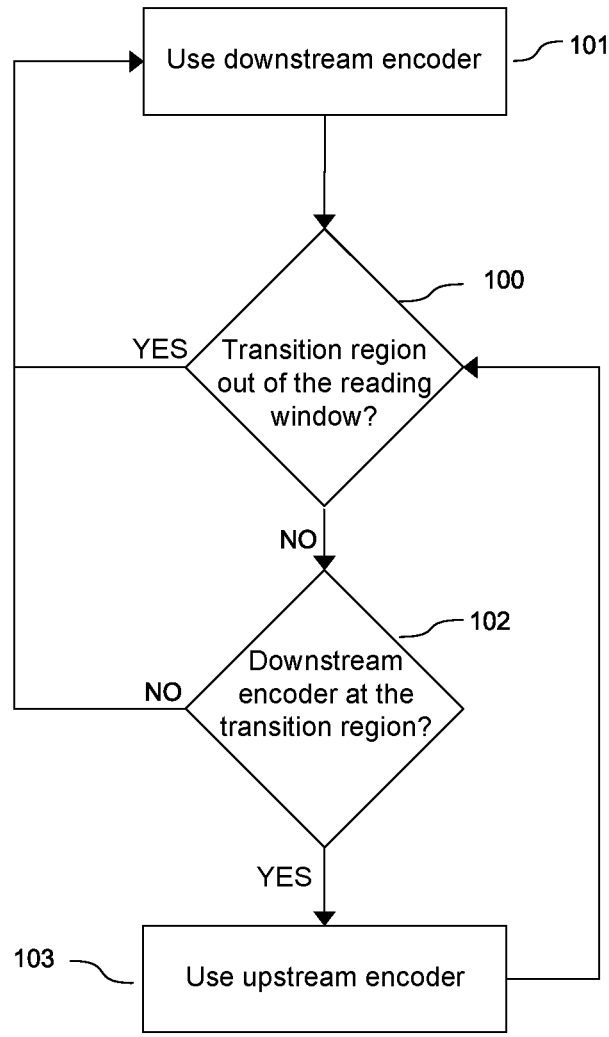
FIGS. 5-8 are flowcharts relating to the operation of the apparatus, system and method for transducing positions and/or displacements of the disclosure.

With reference first to the flowchart of FIG. 5, the controller 40 checks, in a block 100, whether the transition region 8 is out of the reading window 23. In the positive case, the controller 40 uses, in a block 101, the downstream encoder 22.

Therefore, the transduced position/displacement 12 is derived from the signal of encoder 22, possibly coinciding therewith. In particular, the system count SYS_COUNT of system counter 14 is updated in a manner coinciding with or derived from the count of counter 42 associated with the downstream encoder 22. The signals on channels CH-A, CH-B, CH-Z, ERR, if present, may coincide with those on channels CH-A2, CH-B2, CH-Z2, ERR2, or preferably be derived from system count SYS_COUNT (or from USER_COUNT) as described later on.

In FIG. 4, state a) as well as state g) represent a generic mutual position wherein the transition region 8 is out of the reading window 23. Both encoders 21, 22 correctly detect the magnetic field (or other physical quantity with dual characteristics) of the periodic array 3, and their raw signals 25, 30 have a value depending on the specific position within a pole or element 4, 5 of the periodic array 3. In principle, use of either encoder would be possible, but as said, the downstream encoder 22 is used. The counter 41 associated with upstream encoder 21 is not active, or in any case its value is ignored. The counter 42 associated with the downstream encoder 22 is active and count COUNT_2 is incremented during the motion from the positions shown in a) or in g), preferably at the fine resolution using the square wave signals 28, 32 available on channels CH-A2 and CH_B2 in the case of interpolating encoders 21, 22. Neglecting for the time being more complex operating modes, which will be described later on, in a basic operating mode, the system count SYS_COUNT of counter 14 is incremented in accordance with counter 42 (and with its count COUNT_2).

If, on the other hand, the outcome of the check of block 100 is negative, namely if the transition region 8 involves the reading window 23, at least partially overlapping thereto, controller 40 carries out a further check, in a block 102: the controller checks whether the downstream encoder 22 is at the transition region 8. In the negative case, controller 40 continues to use, in block 101, the downstream encoder 22.

In FIG. 4, states b) to e) represent a generic mutual position wherein the following twofold condition holds true: the transition region 8 involves the reading window 23, but the downstream encoder 22 has not arrived yet at the transition region 8. In states b) to d), the upstream encoder 21 is at the transition region 8. In state e) no encoder 21, 22 is at the transition region 8, the two encoders 21, 22 are on opposite sides with respect to the transition region 8, which in any case involves the reading window 23 defined thereby. In this regard, it is recalled that the reading window 23 has a greater length than the estimated maximum size of the transition region 8, so that encoders 21, 22 are not simultaneously involved by the transition region 8 during the mutual motion between array 3 and apparatus 2.

System count SYS_COUNT implemented in system counter 14 continues to be incremented as described above, in a manner derived from (or coinciding with) counter 42 (and its count COUNT_2). Preferably, the counter 41 associated with the upstream encoder 41 is also used, but with an auxiliary function described later on.

If on the other hand the outcome of the check of block 102 is positive, namely if the transition region 8 involves the reading window 23 and in particular involves the downstream encoder 22, which is at the transition region 8, in block 103, the controller 40 switches to use of the upstream encoder 21.

In FIG. 4, state f) represents a generic mutual position wherein the following condition holds true: the downstream encoder 22 is at the transition region 8; in the particular case it is at an unreadable zone 9 thereof, but this is merely illustrative.

The counter 41 associated with the upstream encoder 21 is active and is incremented (count COUNT_1) during the motion in the vicinity of the position shown in state f), preferably at fine resolution using the square wave signals 28, 32 available on channels CH-A1 and CH_B1 in the case of interpolating encoders 21, 22.

Still in a basic operating mode, system count SYS_COUNT is incremented in accordance with counter 41 (and with its count COUNT_1). The counter 42 associated to the downstream encoder 22 is preferably used, but with an auxiliary function described later on.

The use of the upstream encoder 21 ceases in a position which is about, and preferably is, that shown at state g).

While the measurement path 7 is travelled, for example between states a) and g) and back to state a), initially the logical flow follows blocks 100 and 101, subsequently it follows blocks 100, 102, 101, subsequently it follows blocks 100, 102, 103, subsequently it follows again blocks 100, 101. The downstream encoder 22 is predominantly used, in a condition that may be termed a default one, and a consecutive use of the upstream encoder 21 is temporarily made; in the case of a closed measurement path 7 and/or in the case of reciprocating motion along the measurement path 7, also the use of the downstream encoder 22 is consecutive.

Overall, controller 40 switches from default use, when the transition region 8 is out of the reading window 23 of the apparatus 2, of the downstream encoder 22, temporarily to use of the upstream encoder 21 while the downstream encoder 22 is at the transition region 8, with the advantages described in the introductory part.

Preferably, in the condition checked in block 102, one or two safety margins about the transition region 8 relative to the downstream encoder 22 are taken into consideration, which ensure that its signal is in use, for transducing a position/displacement, only when it is at the periodic array 3. From another point of view, it is like considering that the periodic array 3 is interrupted by an "anomalous zone" which is more extended, preferably on both sides, about the transition region 8.

In that case, the temporary use of the signal of the upstream encoder 21 begins before the downstream encoder 22 enters the transition region 8 and/or ends after the downstream encoder 22 leaves the transition region 8. For example, the temporary use of the signal of the upstream encoder 21 begins at state e) of FIG. 4, thus considering an upstream safety margin 50 (instead of continuing to use the downstream encoder 22 in the positions corresponding to such a margin 50) and/or ends at state g) of FIG. 4, thus considering a downstream safety margin 51 (instead of resuming use of the downstream encoder 22 already in the positions corresponding to such a margin 51).

Figure 6:
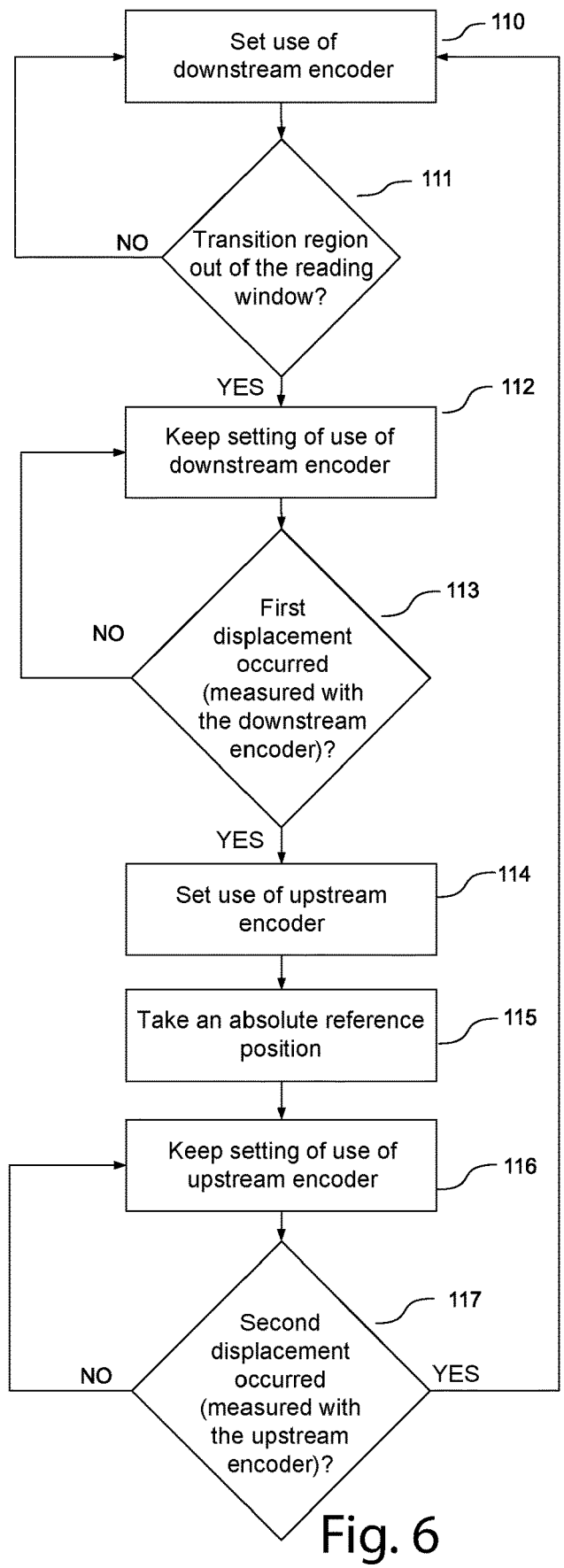

The check of the above described conditions may occur in any useful manner. An example mode is described hereinbelow with reference in particular to FIGS. 4 and 6, which illustrate in greater detail the behaviour of controller 40 or, respectively, the detection method while the measurement path 7 is travelled, in an embodiment of the disclosure. In the flowchart of FIG. 6, an initial position has been assumed, wherein the apparatus 2 is upstream of the transition region 8, for example at state a). Also in this case, reference is made to a motion along the oriented direction Y of FIG. 4.

Initially, the controller 40 sets use of the downstream encoder 22, the default one, block 110. Subsequently, the controller 40 waits for the transition region 8 to enter the reading window 23 of the apparatus 2, as schematized by the block 111 of check of such a condition, cyclically run through as long as the outcome of the check is negative.

Several modes may be used to detect the entry of the transition region 8 in the reading window 23, including use of a marker integral with the periodic array 3 and a detector of such a marker in the apparatus 2. Preferably, however, said entry is detected by occurrence of an error on the output of the upstream encoder 21, for example monitoring its channel ERR1, which is promptly available, with the advantages highlighted in the introductory part. It is noted that, as better evident from FIG. 3, the change of state of channel ERR1 occurs when the upstream encoder 21 enters the unreadable region 9 of the transition region 8, see state b) of FIG. 4; on the other hand, while the upstream encoder 21 is in the upstream incomplete magnetic period 10, it is not in error, although already being in the transition region 8. The detection in this manner thus occurs with a delay, which is in any case neglectable for the following reasons. To begin with, the extent of the delay is small, because in any case it is at most equal to an elementary period PE (or to a spatial period PS with some types of encoder). In any case, the delay does not represent a critical factor, because the upstream encoder 21 is neither in use nor has to be immediately set to use. Therefore, there is no risk of losing any position data, even should the upstream encoder 21 go into error with a short delay with respect to the beginning of the transition region 8 and to its unreadable region 9.

Indeed, also after the waiting of block 111, the controller 40 keeps the setting of use of the downstream encoder 22, the default one. For completeness, in the flowchart a related block 112 is shown, which however does not correspond to any operation actually carried out, possibly to the adjustment of some auxiliary variables. Subsequently, the controller 40 waits for a first displacement 52 to occur, as schematized by block 113 of checking that condition, cyclically run through as long as the outcome of the check is negative.

The first displacement 52 is selected of such an extent that the upstream encoder 21 meets and passes the transition region 8, but its precise value is not particularly binding, and it may easily take the changes due to working tolerances, the changes in the length of the members to which the periodic array 3 and/or the apparatus 2 are fixed, due to the operative conditions and the wear, etc., into account.

The first displacement 52 is advantageously measured by the downstream encoder 22, which is the one in use, also in accordance with what has been described in general with reference to FIG. 5: indeed, the transition region 8 is, by that time, within the reading window 23, but the downstream encoder 22 is not at the transition region 8 yet.

Subsequently, the controller 40 sets the use of the upstream encoder 21, block 114. This event corresponds to state e) of FIG. 4.

Preferably, although not necessarily, when it switches to use the upstream encoder 21, the controller 40 takes, in a block 115, an absolute reference position 53, zeroing, in system counter 14, the system count SYS_COUNT; preferably also the counter 41 associated with the upstream encoder 21 and possibly the counter 42 associated with the downstream encoder 22 is/are zeroed. In this manner the apparatus 2 and the system 1 operate as an absolute position encoder, without the need for a special marker and for a detector of such a marker. An absolute zero signal may also be emitted, for example on channel CH-Z or on another special channel (not shown).

Subsequently, the controller 40 waits for a second displacement 54 to occur, as schematized by block 117 of check of such a condition, cyclically run through as long as the outcome of the check is negative, before returning to block 110 of setting use of the downstream encoder 22, the default one.

For completeness, in the flowchart a block 116 is shown, of keeping the setting of the upstream encoder 21, which however does not correspond to any operation actually carried out, possibly to the adjustment of some auxiliary variables.

The second displacement 54 is selected of such an extent that the downstream encoder 22 meets and passes the transition region 8, but also its precise value is not particularly binding and may easily take the changes described above with reference to the first displacement 52 into account.

The second displacement 54 is advantageously measured by the upstream encoder 21, which is the one in use, also in accordance with what has been described in general with reference to FIG. 5: indeed, during the second displacement 54, the downstream encoder 22 is at the zone comprising the transition region 8, the upstream safety margin 50 and the downstream safety margin 51.

It is worthwhile noting that the two displacements 52, 54, which are respectively measured by the downstream encoder 22 and by the upstream encoder 21, may also be used for measuring a third displacement, not indicated in FIG. 4, beginning from when the transition region 8 has entered the reading window 23, and which ensures that it has left it. This displacement may be used for example for the check of block 100 of FIG. 5, in particular when the condition of entry of the transition region 8 within the reading window 23 is not determined by the error signal ERR1 of the upstream encoder 21, rather through a marker and associated detector, in order to avoid a further marker and/or a further detector. Estimating the leave of the transition region 8 from the reading window 23 through the measurement, beginning from the entry of the transition region 8 within the reading window 23, of a twofold displacement, preferably carried out through the two encoders, represents a particularly innovative aspect of the subject-matter disclosed herein, independently of the other aspects described above, and in particular independently of the fact of using by default the downstream encoder 22 and temporarily switching to the upstream encoder 21.

Still with reference to FIGS. 4 and 6, preferably, when the encoders 21 and 22 are of the interpolation type, the controller 40 waits, to switch from use of the downstream encoder 22 to use of the upstream encoder 21 and/or vice versa, for a zero pulse to be detected by a same encoder 21, 22, more preferably by the downstream encoder 22. This provision has the advantages set forth in the introductory part. Furthermore, to wait for a zero pulse of the downstream encoder 22 to be detected during the error status of the upstream encoder 21 avoids a switching due to a false error signal, not due to the transition region 8, rather to other factors, for example a small noise in the periodic array 3.

In accordance with this optional feature, in FIG. 4, the first displacement 52 is not indicated beginning from state b) wherein the switching of signal ERR1 occurs, rather from the subsequent state c).

Preferably, the first displacement 52 is equal to an integer number W1 of elementary periods PE (or of spatial periods PS, in the case of some types of encoders) and it is waited, to count it, as can be inferred from a comparison between state b) and state c) of FIG. 4, for the first zero pulse on channel CH-Z2 subsequent to the condition of entry of the transition region 8 within the reading window 23—for example, the first zero pulse on channel CH-Z2 after the switching of the signal on channel ERR1.

Alternatively, one may begin counting a first displacement 52 equal to an integer number W1 of elementary periods PE (or of spatial periods PS, in the case of some types of encoders) immediately at the condition of entry of the transition region 8 within the reading window 23—for example, at the switching of the signal on channel ERR1 (beginning from state b)), and wait for the first zero pulse on channel CH-Z2 subsequently to the count.

In practice, the count of an integer number W1 of elementary periods PE (or of spatial periods PS, in the case of some types of encoders) with the downstream encoder 22 may occur by counting the desired number W1 of pulses on channel CH-Z2 (through said coarse count); or by counting W1 units at coarse resolution; or by counting W1*NQ units at fine resolution. The count may start from zero, possibly exploiting an auxiliary counter or an auxiliary memory location if it is not desired to reset counter 42, or it may be evaluated from the difference with respect to the value of counter 42 at count start, which is suitably temporarily stored.

Relative to the second displacement 54, it suffices to provide for it to be equal to an integer number W2 of elementary periods PE (or of spatial periods PS, in the case of some types of encoders) (with W2 in general greater than W1, although this is not strictly necessary) in order to ensure that the count of the second displacement 54 ends, and therefore that the switching to use of the downstream encoder 22 occurs at the emission of a zero pulse of the downstream encoder 22, as desired.

As far as the count of an integer number W2 of elementary periods PE (or of spatial periods PS, in the case of some types of encoders) with the upstream encoder 21 is concerned, what has been said about the count of an integer number W1 of elementary periods PE (or of spatial periods PS, in the case of some types of encoders) with the downstream encoder 22 is valid, mutatis mutandis. In this case, for the reasons set forth hereinbelow, it is appropriate for the count to occur by exploiting an auxiliary counter or an auxiliary memory location, or for it to be evaluated from the difference with respect to the value of counter 42 at count start, which is suitably temporarily stored, without resetting counter 41 at count start.

When switching to use of the downstream encoder 22, at the end of the count of the second displacement 54 by the upstream encoder 21, namely in state g) of FIG. 4, the counter 42 of the downstream encoder 22 is preferably zeroed, for the reasons set forth hereinbelow. System counter 14, in any case, is not zeroed, namely SYS_COUNT preserves the value reached, equal to that of the downstream encoder 22 in the basic operating mode considered thus far, and thus having a value corresponding to W2 if used as coarse count, and to W2*NQ if used as consecutive fine count.

It is understood that preferably, controller 40 is configured to carry out the steps of:
 a) using an output signal of the downstream encoder 22 to derive the transduced position/displacement 12, for example using counter 42 and count COUNT_2 to derive SYS_COUNT,
 b) detecting the entry of the transition region 8 into the reading window 23 of the apparatus 2, preferably through occurrence of an error on channel ERR1 of the upstream encoder 21,
 c) waiting for the upstream encoder 21 to pass past the transition region 8, carried out by measuring with the downstream encoder 22 a first preset displacement 52,
 d) using an output signal of the upstream encoder 21 to derive the transduced position/displacement, for example using counter 41 and count COUNT_1 to derive SYS_COUNT,
 e) waiting for the downstream encoder 22 to pass past the transition region 8, carried out by measuring with the upstream encoder 21 a second preset displacement 54,
 f) returning to step a) of using an output signal of the downstream encoder 22 to derive the transduced position/displacement 12, for example returning to use of counter 42 and count COUNT_2 to derive SYS_COUNT.

It follows that, in default conditions, namely with both encoders 21, 22 out of the transition region 8, the downstream encoder 22 is the source for transducing the positions/displacements, while the upstream encoder 21 performs the function of monitoring the state of the periodic array 3. When the upstream encoder 21 intercepts the transition region 8, it signals that through its error channel ERR1, and this event triggers the procedure of managing the switching between the encoders 21, 22 in order to obviate to the presence of the transition region 8 itself.

Each of the above mentioned displacements 52, 54 is preferably equal to a preset integer number, respectively W1, W2, of zero pulses and/or a preset integer number, respectively W1*NQ, W2*NQ, of wavefronts of the interpolated square waves and/or a preset integer number of wavefronts of the interpolated square waves emitted in sequence after a preset integer number of zero pulses, the pulses being emitted by the involved encoder 21, 22.

More preferably, one or more of the above mentioned displacements 52, 54 comprise(s) an integer number of zero pulses emitted by the involved encoder 21, 22, for the reasons set forth in the introductory part.

Preferably the controller 40 is configured to carry out, between said step c) and said step d), the step of waiting for a subsequent zero pulse of the downstream encoder 22, for the reasons set forth in the introductory part.

Alternatively or additionally, preferably the controller 40 is configured to carry out, between said step e) and said step f), the step of waiting for a subsequent zero pulse of the downstream encoder 22, for the reasons set forth in the introductory part.

Figure 7:
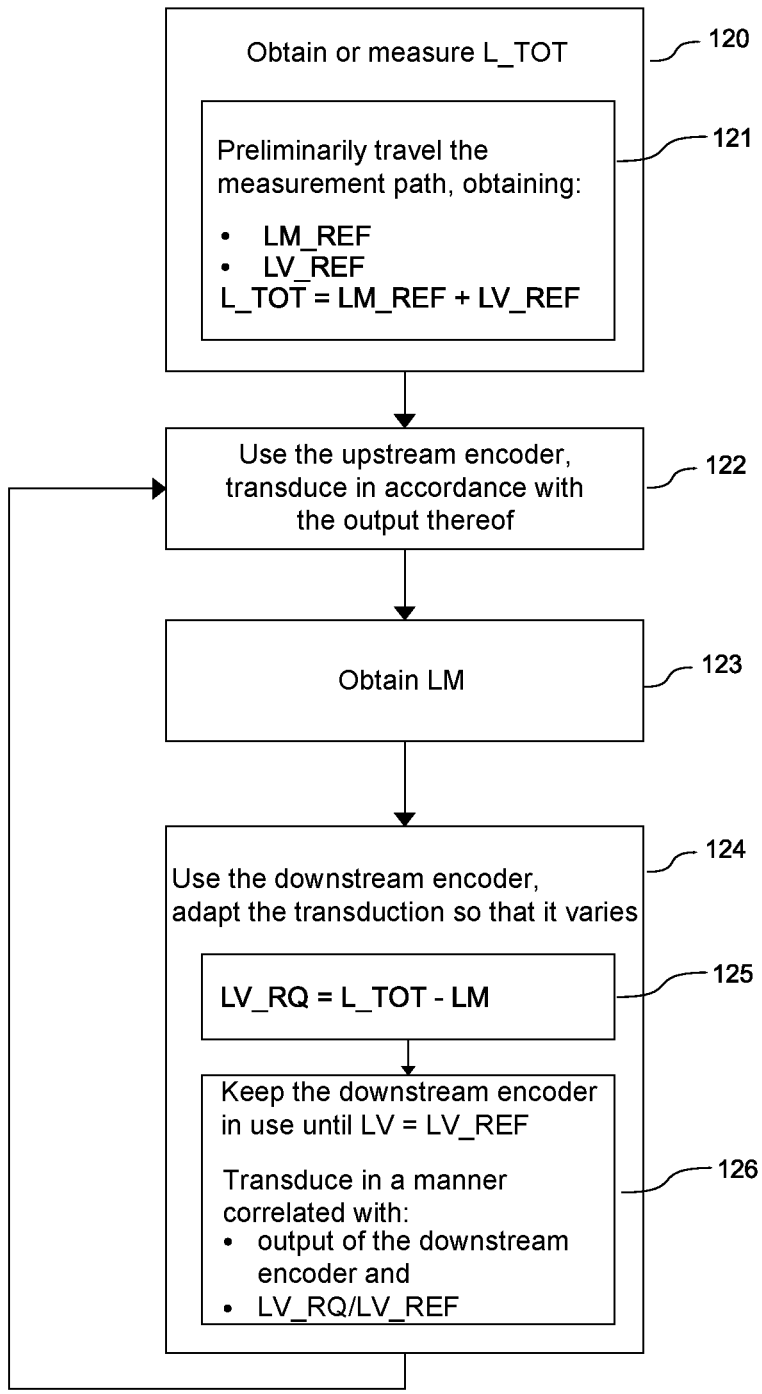

A possible, more complex operating mode for controller 40 is now described with reference in particular to the flowchart of FIG. 7.

In a block 120, the controller 40 obtains as input or measures, preliminarily, the total length L_TOT of the measurement path 7.

Preferably, as shown in nested block 121, the total length L_TOT is measured by the system 1 itself, during a preliminary travel of the measurement path 7, it being computed as the sum of the length LM_REF measured by the upstream encoder 21 while it is in use, and the length LV_REF measured by the downstream encoder 22 while it is in use.

It is emphasized that, when for the switching between the encoders 21, 22 the first zero pulse of the downstream encoder 22 is waited for, the downstream encoder 22 remains in use for a duration which is a multiple of the elementary period PE (or of spatial period PS, in the case of some types of encoders) of the periodic array 3, so that LV_REF and LV are always integer multiples of that elementary period PE (or spatial period PS).

The operations described thus far (block 120, preferably block 121) are carried out in a preliminary setting step, at installation of system 1 and whenever desired, for example after a certain time of use of the body under measurement, in order to take the effect of wear, vibrations, etc. into account.

After said preliminary step, namely at full operation, in block 122, the controller 40, while the upstream encoder 21 is (temporarily) in use, provides a transduced position/displacement 12 in accordance with the output of the upstream encoder 21; in particular when the system 1 operates taking the absolute reference 53 as described above, system count SYS_COUNT emitted by system counter 14 is incremented in accordance with count COUNT_1 of counter 41, having in particular the same value if the counters are zeroed at the absolute reference position 53 as described above.

At the end of the consecutive use of the upstream encoder 21, the controller 40 obtains the length LM that it has measured, block 123, as the value COUNT_1 of counter 41 if it had been zeroed, or from the difference between the value it had initially and the value it has at the end of the continuative use.

With reference to FIG. 4 and to what has been described above, it is noted that the measured length LM is only in principle equal to the second displacement 54. Indeed, because of a non-linearity of the response of sensor(s) 24, 29 of the upstream encoder 21, of errors of the interpolator(s) 27, 31, of changes in the length of the measurement path 7 due to vibrations, wear, settlement of mechanical parts, presence of shock-absorbing elements etc., and/or of the waiting of the first zero pulse of the downstream encoder 22 on channel CH-Z2 before either or both the switchings between the encoders 21, 22, in practice it happens that every time the measurement path 7 is travelled, the upstream encoder 21 counts a different number of units, especially at fine resolution.

While the downstream encoder 22 is subsequently in use, block 124, the controller 40 adapts the transduced position/displacement 12, in particular system count SYS_COUNT emitted by system counter 14, so that it varies, apart from an additive factor, between two extreme values given by: (i) the length LM that was measured while the upstream encoder 22 was in use, and (ii) the total length L_TOT of the measurement path 7. The additive factor is null in the case of use of the absolute zero position 53 as described above.

The operations of blocks 122, 123, 124 repeat at each subsequent travel of the measurement path 7, as represented by return arrow from block 124 to block 122.

The operations described with reference to block 124 are preferably carried out, as shown in the nested sequence of blocks 125, 126, in the following manner:

the controller 40 computes, block 125, an expected length LV_REQ which should be measured by the downstream encoder 21, as difference between the total length L_TOT of the measurement path 7 and the length LM measured by the upstream encoder 21 while it has been consecutively in use;

the controller 40, in block 126, keeps the downstream encoder 22 in use until it has measured a displacement LV equal to the length LV_REF that it had measured during the preliminary travel of the measurement path 7—what automatically occurs if, in order to begin the measurement of the first displacement 52, the zero signal of the downstream encoder 22 after the error signal ERR1 of the upstream encoder 21 is waited for; during this step, controller 40 provides for a transduced position/displacement 12, in particular count SYS_COUNT of system counter 14, correlated (i) with the output of the downstream encoder 22 and (ii) with the ratio between the expected length LV_REQ and the length (LV_REF) measured by the downstream encoder 22 during the preliminary travel of the measurement path 7.

System count SYS_COUNT of system counter 14 is thus not incremented in accordance with counter 42, rather it is incremented taking the conversion factor LV_RQ/LV_REF into account. In the block diagram of FIG. 2, the conversion factor is computed and applied at the output of counter 42 through the adaptive counter 18, which inter alia implements a multiplier: adaptive counter 18 attends at providing, to switch 16, the adapted count on which system count SYS_COUNT is based, and lastly onto which the transduced position/displacement 12 is based.

The adaptation of the counts is preferably carried out by performing an increase by two units or by skipping an increment, depending on whether the expected length LV_RQ is greater than or less than the reference length LV_REF, at spaced intervals along the corresponding part of measurement path 7. This may be obtained, advantageously, considering the integer part of the product between count COUNT_2 of counter 41 associated with the downstream encoder 21 and the conversion factor LV_RQ/LV_REF.

In a less preferred alternative, adaptation of the counter may occur by increasing system counter 14 at a different rate than increment of counter 42.

It is noted that, if the total length L_TOT of measurement path 7 is obtained as input by controller 40 (block 120) rather than directly measuring it (block 121), for example through a linear measurement with a precision meter, it is still possible to carry out the first travel of the measurement path 7 without applying any conversion factor, and obtain from that first travel the measured length LV_REF, useful to apply the conversion factor to the subsequent travels, at full operation.

The feature described above with reference to FIG. 7 represents a particularly innovative aspect of the subject-matter disclosed herein, independently of the other aspects described above, and in particular independently of using by default the downstream encoder 22 and temporarily switching to the upstream encoder 21. The Applicant has indeed perceived that, although the mutual distance between the encoders 21, 22 is fixed, during a relative displacement between apparatus 2 and periodic array 3 from a first position to a second position along the measurement path 7, they may provide a different transduction of the displacement, although having the same rated resolution, because of the various factors mentioned above, and in particular of the non-linearity of response and of the interpolation error, which cause the transduction of a displacement within one element 4, 5 of the periodic array to be neither linear nor repeatable, least of all consistent between two different encoders. Thus, during switching from use of one encoder to use of the other encoder, the difference between the two counts of the two counters 41, 42 at the second position is in general not equal to the difference between the two counts of the two counters 41, 42 at the first position. Repeating the same displacement between the same two positions, or between two positions physically separated by the same length, furthermore, in general the variation changes. The operation mode described above allows a repeatable transduction along the measurement path 7 to be obtained, by taking up these variations and distributing them on the preponderant part of measurement path wherein the downstream encoder is active, advantageously rendering them neglectable.

It is thus possible to provide, as requested by some applications, for a transduced position/displacement having a constant maximum value (or integer multiples thereof, if there is no zeroing at the absolute zero position) at the end of a travel of the measurement path, independently of variations at each travel of the measurement path, in particular at each turn in the case of a rotary encoder.

Another possible operating mode for the controller 40 is now described with reference in particular to the flowchart of FIG. 8.

In a block 130, the controller 40 preliminarily obtains as input or measures the total length L_TOT of the measurement path 7. As far as block 130 is concerned, and nested block 131 representing a preferred form thereof, what has been discussed with reference to blocks 120, 121 of FIG. 7 applies.

In the same or in a second preliminary step, in a block 132 which is represented as subsequent to block 130 merely by way of example, the controller 40 receives in input a desired maximum value L_USER for the transduction of the total length (physical length) of the measurement path 7.

The controller 40 subsequently adapts, block 133, the transduced position/displacement 12 so that at each subsequent travel of the measurement path 7 it varies by L_USER units, and therefore, apart from an additive factor, from 1 to the desired maximum value L_USER (or from 0 to L_USER-1). Thus, a second conversion factor L_USER/L_TOT is applied.

In this manner, the configuration of the apparatus 2 may be customized based on the requirements of the user for which the transduction of position/displacement is intended.

The above mentioned operations are carried out, in practice, in an analogous manner to what has been described with reference to blocks 124, 126 of FIG. 7, mutatis mutandis.

It is possible to implement the features described with reference to FIG. 8, but not the features described with reference to FIG. 7, or vice versa.

It is also possible to implement both the features described with reference to FIG. 7, and the features described with reference to FIG. 8. In that case, steps 120, 130 and respectively 121, 131 coincide. In that case, at the output of the upstream encoder 21, only the second conversion factor L_USER/L_TOT will be applied, while at the output of the downstream encoder 22 also the conversion factor LV_RQ/LV_REF will be applied.

In the block diagram of FIG. 2, the adaptation operations described above with reference to block 133 are carried out by user counter 20, arranged downstream of system counter 14. The user counter 20 could however also be divided in the two branches upstream of the switch 16 which is part of the system counter 14.

As far as the phase generator 17 is concerned, which is preferably implemented by controller 40, as mentioned above it has the function of deriving, from system count SYS_COUNT provided by system counter 14 or preferably, from count USER_COUNT provided by user counter 20, the signals to be emitted on channels CH-Z, CH-A, CH-B, ERR.

It is noted that in the flowcharts, sometimes the names of some variables used above have been used for the sake of brevity, but of course this has a merely illustrative and non-limiting purpose.

For the sake of easiness, hereinabove reference has been mainly made to a one-dimensional mutual motion between periodic array 3 and apparatus 2. However, those skilled in the art will understand, in the light of the present description, how to apply the disclosure to the case of a bidirectional motion. Essentially, it is a matter of acquiring the rotation direction, for example monitoring the phase of signals 25, 30 or 28, 32 of sensors 24, 29, and as a consequence associating the function of upstream sensor and downstream sensor to the corresponding sensor.

Hereinabove, reference has been mainly made to encoders of the magnetic type, merely by way of non-limiting example. Those skilled in the art will understand how to apply the disclosure to the case of encoders of another type.

Those skilled in the art will understand that the above described controller 40 may have a hardware, software, firmware implementation, or a combination thereof, and the specific implementation is within the skills of those skilled in the art, in the light of the present description. Merely by way of example, an implementation of the controller in an FPGA (Field Programmable Gate Array) is mentioned.

Hereinabove, a method for transducing position/displacements has also been described, comprising the steps of:

arranging a pair of encoders along a measurement path 7 along which a periodic array 3 is arranged, having contiguous elements 4, 5 with alternate dual characteristics, wherein along the measurement path 7 there is at least one transition region 8 of discontinuity in periodicity of the periodic array 3 and/or unreadable, subjecting, in use, the periodic array 3 to a mutual motion with respect to the encoders 21, 22 along the measurement path 7, the encoders 21, 22 defining the ends of a reading window 23 having a greater length than the estimated maximum size of the transition region 8 so that they are not simultaneously involved by the transition region 8 during the mutual motion, emitting a transduced position/displacement 12 on the basis of signals from the encoders 21, 22, switching from use of one encoder to use of the other encoder 21, 22 in order to manage the presence of the transition region 8, characterized by comprising the steps of:

using by default, when the transition region 8 is out of the reading window 23 of the apparatus 2, the downstream encoder 22, temporarily using the upstream encoder 21 while the downstream encoder 22 is at the transition region 8.

Preferred features of the method correspond to preferred features of the above described controller.

The various alternative embodiments, variants and/or possibilities of each component or group of components that have been described should be meant as combinable with each other in any manner, unless they are incompatible with each other.

The above is a description of various embodiments variants and/or possibilities of inventive aspects, and further changes can be made without departing from the scope of the present disclosure. The shape and/or size and/or location and/or orientation of the various components and/or the succession of the various steps can be changed. The functions of an element or module can be carried out by two or more components or modules, and vice-versa. Components shown directly connected to or contacting each other can have intermediate structures arranged in between them. Steps shown directly following each other can have intermediate steps carried out between them. The details shown in a figure and/or described with reference to a figure or to an embodiment can apply in other figures or embodiments. Not all of the details shown in a figure or described in a same context must necessarily be present in a same embodiment. Features or aspects that turn out to be innovative with respect to the prior art, alone or in combination with other features, should be deemed to be described per se, irrespective of what is explicitly described as innovative.

The invention claimed is:

1. A position/displacement transducer apparatus comprising:
   a pair of encoders arranged along a measurement path along which a position/displacement encoding periodic array is arranged, having contiguous elements with alternate dual characteristics, wherein along the measurement path there is at least one transition region, the transition region being a region of discontinuity in periodicity of the periodic array and/or an unreadable region, the periodic array being subject, in use, to a mutual motion with respect to the encoders along the measurement path, the encoders defining the ends of a reading window having a greater length than an estimated maximum size of the transition region so that both encoders are not simultaneously involved by the transition region during the mutual motion, wherein an upstream encoder of the pair of encoders arrives at the transition region first and a downstream encoder of the pair of encoders arrives at the transition region after the upstream encoder during the mutual motion,
   a controller which emits a transduced position/displacement on the basis of signals from the encoders, and which switches from use of one encoder to use of the other encoder in order to manage the presence of the transition region, wherein:
   during default condition, the controller is configured to use the downstream encoder to provide the transduced position/displacement and the transition region is out of the reading window of the apparatus, and
   during transition, while the downstream encoder is at the transition region, the controller is configured to temporarily switch to use the upstream encoder to provide the transduced position/displacement.

2. The position/displacement transducer apparatus according to claim 1, wherein the controller is configured to switch to temporary use of the upstream encoder before the downstream encoder enters the transition region and/or to end temporary use of the upstream encoder after the downstream encoder leaves the transition region.

3. The position/displacement transducer apparatus according to claim 1, wherein the controller is configured to use the downstream encoder during a step wherein the transition region is not within the reading window of the apparatus and additionally at least during the detection of a first displacement by the downstream encoder while the transition region is within the reading window of the apparatus, but the downstream encoder is not at the transition region, wherein the first displacement is such that the upstream encoder is configured to meet and pass the transition region.

4. The position/displacement transducer apparatus according to claim 1, wherein the controller is configured to use the upstream encoder at least during a second displacement detected with the upstream encoder, wherein the second displacement is such that the downstream encoder is configured to meet and pass the transition region.

5. The position/displacement transducer apparatus according to claim 1, wherein the entry of the transition region within the reading window of the apparatus is detected from the fact that the upstream encoder goes into error.

6. The position/displacement transducer apparatus according to claim 1, wherein the fact that the transition region is no longer within reading window of the apparatus is estimated from the detection of a third displacement from the position of entry of the transition region within the reading window of the apparatus.

7. The position/displacement transducer apparatus according to claim 1, wherein, when switching to use the upstream encoder, the controller is configured to take an absolute reference position.

8. The position/displacement transducer apparatus according to claim 1, wherein the encoders are of an interpolation type and the controller is configured to wait, to switch from use of the downstream encoder to use of the upstream encoder and/or vice versa, for a zero pulse to be detected by a same encoder.

9. The position/displacement transducer apparatus according to claim 1, wherein the encoders are of a quadrature type.

10. The position/displacement transducer apparatus according to claim 1, wherein the controller is configured to:
    obtain or measure, preliminarily, a total length (L_TOT) of the measurement path,
    and, at each travel of the measurement path:
    while the upstream encoder is in use, keep the transduced position/displacement in accordance with the output of the upstream encoder,
    while subsequently the downstream encoder is in use, adapt the transduced position/displacement so that it varies, apart from an additive factor, between two extreme values given by: a length (LM) that was measured while the upstream encoder was in use, and the total length (L_TOT) of the measurement path.

11. The position/displacement transducer apparatus according to claim 1, wherein the controller is configured to, in a setting condition:
    obtain as input or measure a total length (L_TOT) of the measurement path,
    obtain a length (LV_REF) measured by the downstream encoder in a preliminary travel of the measurement path,
    and, at each subsequent travel of the measurement path:
    while the upstream encoder is in use, keep the transduced position/displacement in accordance with the output of the upstream encoder,
    compute an expected length (LV_REQ) which should be measured by the downstream encoder as difference between the total length (L_TOT) of the measurement path and the length (LM) measured by the upstream encoder while it has been consecutively in use, and keep the downstream encoder in use until it has measured a displacement equal to the length (LV_REF) that it had measured during the preliminary travel of the measurement path, providing a transduced position/displacement correlated with the output of the downstream encoder and with the ratio between the expected length (LV_REQ) and the length (LV_REF) measured by the downstream encoder during the preliminary travel of the measurement path.

12. The position/displacement transducer apparatus according to claim 1, wherein the controller is configured to:
obtain or measure, preliminarily, a total length (L_TOT) of the measurement path,
receive in input a desired maximum value (L_USER) for the transduction of the total length (L_TOT) of the measurement path, and
adapt the transduced position/displacement so that at each subsequent travel of the measurement path it varies, apart from an additive factor, from zero to the desired maximum value.

13. The position/displacement transducer apparatus according to claim 12, wherein obtaining as input or measuring a total length (L_TOT) of the measurement path comprises computing the total length (L_TOT) as the sum of the length (LM_REF) measured by the upstream encoder while it is in use, and the length (LV_REF) measured by the downstream encoder while it is in use during the or respectively a preliminary travel of the measurement path.

14. The position/displacement transducer apparatus according to claim 1, comprising at least one, and preferably all the following outputs:
at least one square wave signal and preferably two signals in quadrature, corresponding to or derived from that/those of the encoder in use,
a zero pulse signal of the periodic array, corresponding to or derived from that/those of the encoder in use,
an error signal,
an absolute zero pulse signal, wherein a pulse is emitted at a position taken as an absolute reference along the measurement path,
at least one digital count signal codifying a position, preferably an absolute position with respect to the absolute reference position, and/or a relative displacement.

15. The position/displacement transducer apparatus according to claim 1, wherein the controller is configured to carry out the steps of:
a) using the downstream encoder to derive the transduced position/displacement,
b) detecting the entry of the transition region into the reading window of the apparatus, preferably through detecting the fact that the upstream encoder goes into error,
c) waiting for the upstream encoder to pass past the transition region, carried out by measuring with the downstream encoder a first displacement,
d) using the upstream encoder to derive the transduced position/displacement,
e) waiting for the downstream encoder to pass past the transition region, carried out by measuring with the upstream encoder a second displacement,
f) returning to step a) of using the downstream encoder to derive the transduced position/displacement.

16. The position/displacement transducer apparatus according to claim 15, wherein each of the displacements is equal to a preset integer number of zero pulses and/or a preset integer number of wavefronts of a square wave and/or a preset integer number of wavefronts of a square wave emitted in sequence after a preset integer number of zero pulses, the pulses being emitted by the involved encoder.

17. The position/displacement transducer apparatus according to claim 15, wherein one or more of the displacements comprise(s) an integer number of zero pulses emitted by the involved encoder.

18. The position/displacement transducer apparatus according to claim 15, wherein the controller is configured to carry out, between said step c) and said step d), the step of waiting for a subsequent zero pulse of the downstream encoder, and/or carry out, between said step e) and said step f), the step of waiting for a subsequent zero pulse of the downstream encoder.

19. A position/displacement transducer system comprising the apparatus according to claim 1 and said position/displacement encoding periodic array.

20. The position/displacement transducer system according to claim 19, wherein the periodic array is made in a band embedded in a conveyor belt.

21. A method for transducing a position and/or displacements, the method including the following steps:
arranging a pair of encoders along a measurement path along which a periodic array is arranged, having contiguous elements with alternate dual characteristics, wherein along the measurement path there is at least one transition region, the transition region being a region of discontinuity in periodicity of the periodic array and/or an unreadable region,
subjecting, in use, the periodic array to a mutual motion with respect to the encoders along the measurement path, the encoders defining the ends of a reading window having a greater length than an estimated maximum size of the transition region so that both encoders are not simultaneously involved by the transition region during the mutual motion, wherein an upstream encoder of the pair of encoders arrives at the transition region first and a downstream encoder of the pair of encoders arrives at the transition region after the upstream encoder during the mutual motion, and
emitting a transduced position/displacement on the basis of signals from the encoders, switching from use of one encoder to use of the other encoder in order to manage the presence of the transition region,
wherein the method further includes the steps of:
during default condition, the downstream encoder is used for providing the transduced position/displacement and the transition region is out of the reading window, and
during transition, while the downstream encoder is at the transition region, switching to use the upstream encoder for providing the transduced position/displacement.

22. The position/displacement transducer apparatus according to claim 11, wherein obtaining as input or measuring a total length (L_TOT) of the measurement path comprises computing the total length (L_TOT) as the sum of the length (LM_REF) measured by the upstream encoder while it is in use, and the length (LV_REF) measured by the downstream encoder while it is in use during the or respectively a preliminary travel of the measurement path.

23. The position/displacement transducer apparatus according to claim 7, wherein, when switching to use the upstream encoder, the controller also emits an absolute zero signal.

24. The position/displacement transducer apparatus according to claim 8, wherein the controller is configured to wait, to switch from use of the downstream encoder to use of the upstream encoder and/or from use of the upstream encoder to use of the downstream encoder, for the zero pulse to be detected by the downstream encoder.

* * * * *